(12) United States Patent
Weith et al.

(10) Patent No.: US 10,498,605 B2
(45) Date of Patent: Dec. 3, 2019

(54) CLOUD BASED SYSTEMS AND METHODS FOR DETERMINING AND VISUALIZING SECURITY RISKS OF COMPANIES, USERS, AND GROUPS

(71) Applicant: Zscaler, Inc., San Jose, CA (US)

(72) Inventors: Loren Weith, San Jose, CA (US); Deepen Desai, San Ramon, CA (US); Amit Sinha, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 165 days.

(21) Appl. No.: 15/672,115

(22) Filed: Aug. 8, 2017

(65) Prior Publication Data

US 2017/0359220 A1   Dec. 14, 2017

Related U.S. Application Data

(63) Continuation-in-part of application No. 15/171,013, filed on Jun. 2, 2016, now Pat. No. 10,142,362.

(51) Int. Cl.
| | |
|---|---|
| *H04L 29/06* | (2006.01) |
| *H04L 12/24* | (2006.01) |
| *G06F 16/28* | (2019.01) |
| *G06F 16/25* | (2019.01) |
| *G06F 16/23* | (2019.01) |

(52) U.S. Cl.
CPC ......... *H04L 41/0893* (2013.01); *G06F 16/23* (2019.01); *G06F 16/25* (2019.01); *G06F 16/285* (2019.01); *H04L 63/0227* (2013.01); *H04L 63/08* (2013.01); *H04L 63/12* (2013.01); *H04L 63/1433* (2013.01); *H04L 63/20* (2013.01); *H04L 63/1441* (2013.01)

(58) Field of Classification Search
CPC ............. H04L 63/1433; H04L 63/0893; H04L 63/0227; H04L 63/20; H04L 63/1441; H04L 63/08; H04L 63/12; H04L 63/14; G06F 16/285; G06F 16/25
USPC .......................................................... 726/22
See application file for complete search history.

(56) References Cited

U.S. PATENT DOCUMENTS

| | | | |
|---|---|---|---|
| 6,983,266 B1 * | 1/2006 | Goldschmidt | ......... G06N 5/043 706/52 |
| 7,894,350 B2 | 2/2011 | Kailash et al. | |
| 7,899,849 B2 | 3/2011 | Chaudhry et al. | |
| 8,286,239 B1 | 10/2012 | Sutton | |
| 8,478,708 B1 | 7/2013 | Larcom | |

(Continued)

*Primary Examiner* — Syed A Zaidi
(74) *Attorney, Agent, or Firm* — Clements Bernard Walker; Lawrence A. Baratta, Jr.

(57) ABSTRACT

Systems and method implemented through a distributed security system for determining and addressing risk of users, groups of users, locations, and/or companies include obtaining log data from the distributed security system; analyzing the log data to obtain a risk score for an entity associated with the distributed security system, wherein the entity comprises one of a user, a group of users, a location, and a company, and wherein the risk score is a weighted combination of pre-infection behavior, post-infection behavior, and suspicious behavior; performing one or more remedial actions for the entity; and subsequently obtaining updated log data and analyzing the updated log data to obtain an updated risk score to determine efficacy of the one or more remedial actions.

17 Claims, 11 Drawing Sheets

(56) References Cited

U.S. PATENT DOCUMENTS

| | | | |
|---|---|---|---|
| 8,479,276 B1 * | 7/2013 | Vaystikh | G06F 21/577 713/160 |
| 8,499,331 B1 | 7/2013 | Yehuda et al. | |
| 8,806,593 B1 | 8/2014 | Raphel et al. | |
| 8,869,259 B1 | 10/2014 | Udupa et al. | |
| 2001/0013030 A1 * | 8/2001 | Colby | G06F 16/24539 |
| 2003/0126472 A1 * | 7/2003 | Banzhof | G06F 21/577 726/25 |
| 2005/0086328 A1 | 4/2005 | Landram et al. | |
| 2006/0101517 A1 * | 5/2006 | Banzhof | G06F 21/577 726/25 |
| 2006/0191012 A1 * | 8/2006 | Banzhof | G06F 21/577 726/25 |
| 2007/0195779 A1 | 8/2007 | Judge et al. | |
| 2007/0234426 A1 | 10/2007 | Khanolkar et al. | |
| 2009/0036111 A1 | 2/2009 | Danford et al. | |
| 2009/0178131 A1 | 7/2009 | Hudis et al. | |
| 2009/0178132 A1 | 7/2009 | Hudis et al. | |
| 2010/0080383 A1 | 4/2010 | Vaughan et al. | |
| 2010/0125897 A1 | 5/2010 | Jain et al. | |
| 2010/0125903 A1 | 5/2010 | Devarajan et al. | |
| 2010/0293610 A1 | 11/2010 | Beachem et al. | |
| 2010/0333177 A1 | 12/2010 | Donley et al. | |
| 2011/0131275 A1 | 6/2011 | Maida-Smith et al. | |
| 2011/0137905 A1 | 6/2011 | Good et al. | |
| 2011/0167474 A1 * | 7/2011 | Sinha | G06F 21/51 726/1 |
| 2012/0179802 A1 | 7/2012 | Narasimhan et al. | |
| 2012/0215898 A1 | 8/2012 | Shah et al. | |
| 2015/0207813 A1 * | 7/2015 | Reybok | H04L 63/145 726/22 |
| 2015/0281287 A1 * | 10/2015 | Gill | G06F 21/55 726/1 |
| 2015/0319182 A1 * | 11/2015 | Natarajan | G06F 21/53 726/24 |
| 2016/0028759 A1 * | 1/2016 | Visbal | H04L 63/1441 726/22 |

* cited by examiner

CLOUD BASED SYSTEMS AND METHODS FOR DETERMINING AND VISUALIZING SECURITY RISKS OF COMPANIES, USERS, AND GROUPS

CROSS-REFERENCE TO RELATED APPLICATION(S)

The present patent/application is a continuation-in-part of U.S. patent application Ser. No. 15/171,013, filed Jun. 2, 2016, and entitled "CLOUD BASED SYSTEMS AND METHODS FOR DETERMINING SECURITY RISKS OF USERS AND GROUPS," the contents of which are incorporated by reference.

FIELD OF THE DISCLOSURE

The present disclosure generally relates to computer networking systems and methods. More particularly, the present disclosure relates to cloud-based systems and methods for determining and visualizing security risks of companies, users, and groups and addressing the security risks in a cloud-based security system.

BACKGROUND OF THE DISCLOSURE

Intrusion detection, web proxy, and other types of security enforcement platforms detect and then perform one or more of various available actions upon the traffic as it passes, including but not limited to blocking, allowing, or logging the event for later analysis. Some systems perform analysis in addition to the logging. One exemplary type of security enforcement platform is a cloud-based distributed security system, such as available from Zscaler, Inc., the assignee of the present application. Such distributed security systems are multi-tenant and can manage thousands or even millions of user devices, seamlessly regardless of location, platform, device type, etc. Enterprise system administrators and executives have a great interest in having visibility into the behavior of their users toward the end of knowing which users constitute a particular type of risk and to what degree. Conventional approaches address the basic problem by counting negative events and comparing users on that basis. That is, conventional approaches are transaction-based for high-risk location and users, providing the top users by threat category. Thus, security, using conventional approaches, can only focus on which users have the higher transactions. In reality, users or groups with lower count negative events may actually pose a greater risk.

There is a need for more accurate techniques for determining security risks of users and groups for targeting more monitoring and protection at those users and groups, such as to address the users and groups from a security standpoint who are the highest risk, not necessarily the highest negative count of transactions.

BRIEF SUMMARY OF THE DISCLOSURE

In an exemplary embodiment, a method implemented through a distributed security system for determining and addressing risk of users, groups of users, locations, and/or companies includes obtaining log data from the distributed security system; analyzing the log data to obtain a risk score for an entity associated with the distributed security system, wherein the entity comprises one of a user, a group of users, a location, and a company, and wherein the risk score is a weighted combination of pre-infection behavior, post-infection behavior, and suspicious behavior; performing one or more remedial actions for the entity; and subsequently obtaining updated log data and analyzing the updated log data to obtain an updated risk score to determine efficacy of the one or more remedial actions. The analyzing to obtain the risk score can include performing a plurality of levels of aggregation on the log data to determine threats for the entity and to categorize the threats; and determining the risk score for the entity based on a weighted formula of the categorized threats and a length of infection of each. The plurality of levels of aggregation can each a form of a Structured Query Language (SQL) query on the log data. The categorized threats can be segmented in the pre-infection behavior, the post-infection behavior, and the suspicious behavior. The post-infection behavior is weighted higher than the pre-infection behavior which is weighted higher than the suspicious behavior.

The entity can include a company, group, or location and the risk score comprises a combination of risk scores associated with users of the company, group, or location. The method can further include comparing the risk score to a plurality of risk scores for other entities; and performing the one or more remedial actions based on the comparing. The method can further include performing one or more additional remedial actions based on the determined efficacy. The one or more remedial actions can include adding or changing services for the entity from the distributed security system.

In another exemplary embodiment, a distributed security system configured to determine and address risk of users, groups of users, locations, and/or companies includes one or more cloud nodes configured to monitor for security threats and maintain logs of transactions; and one or more servers each including memory storing instructions that, when executed, cause a processor to obtain log data from the distributed security system; analyze the log data to obtain a risk score for an entity associated with the distributed security system, wherein the entity comprises one of a user, a group of users, a location, and a company, and wherein the risk score is a weighted combination of pre-infection behavior, post-infection behavior, and suspicious behavior; perform one or more remedial actions for the entity; and subsequently obtain updated log data and analyzing the updated log data to obtain an updated risk score to determine efficacy of the one or more remedial actions.

In a further exemplary embodiment, a log node in a distributed system configured to determine and address risk of users, groups of users, locations, and/or companies includes a network interface, a data store, and a processor communicatively coupled to one another; and memory storing computer executable instructions, and in response to execution by the processor, the computer-executable instructions cause the processor to obtain log data from the distributed security system; analyze the log data to obtain a risk score for an entity associated with the distributed security system, wherein the entity comprises one of a user, a group of users, a location, and a company, and wherein the risk score is a weighted combination of pre-infection behavior, post-infection behavior, and suspicious behavior; cause or suggest performance one or more remedial actions for the entity; and subsequently obtain updated log data and analyzing the updated log data to obtain an updated risk score to determine efficacy of the one or more remedial actions.

In an exemplary embodiment, a method is implemented by one or more servers associated with a cloud-based security system, for determining security risks of entities including users or groups of users associated with the cloud-based security system and optimizing remediation based thereon. The method includes maintaining logs of transactions through the cloud-based security system; obtaining a plurality of attributes from the transactions while excluding impossible comparison items from the transactions; performing empirical scoring on normalizing the plurality of attributes for ranking risky entities; identifying the risky entities based on one of the empirical scoring and analytics; and updating policies and/or monitoring in the cloud-based system based on the identifying. The cloud-based security system is multi-tenant system supporting a plurality of users, companies, and/or enterprises and the empirical scoring provides a deterministic comparison between the plurality of users, companies, and/or enterprises in the multi-tenant system. The plurality of attributes can include primary attributes and secondary attributes, wherein the primary attributes can define a transaction with a subject, a user, and a type of threat, and wherein the secondary attributes can include insights based on parsing the transactions. The empirical scoring can include adjusting a raw score in a time period based on minimum values, maximum values, and a plurality of quantiles. The empirical scoring can include categorizing violations based on security policy into categories and applying modifiable weightings thereto and determining a risk score as a weighted combination of normalized scores for each of the categories. The categories can include infected, malware, and suspicious and the modifiable weightings are applied such that infected is higher than malware which is higher than suspicious. The empirical scoring can further include applying a factor for length of infection. The updating can include changing the policies for the risky entities through the cloud-based system to adjust what functionality the risky entities are allowed to perform.

In another exemplary embodiment, a cloud-based security system is configured to determine security risks of entities including users or groups of users associated with the cloud-based security system and optimize remediation based thereon. The cloud-based security system includes one or more cloud nodes adapted to monitor the entities for security threats and maintain logs of transactions through the cloud-based security system; and one or more servers each including memory storing instructions that, when executed, cause a processor to obtain a plurality of attributes from the transactions while excluding impossible comparison items from the transactions; perform empirical scoring on normalizing the plurality of attributes for ranking risky entities; identify the risky entities based on one of the empirical scoring and analytics; and update policies and/or monitoring in the one or more cloud nodes based on the risky entities.

In a further exemplary embodiment, a log node in a cloud-based security system is configured to determine security risks of entities including users or groups of users associated with the cloud-based security system. The log node includes a network interface, a data store, and a processor communicatively coupled to one another; and memory storing computer executable instructions, and in response to execution by the processor, the computer-executable instructions cause the processor to maintain logs of transactions through the cloud-based security system; obtain a plurality of attributes from the transactions while excluding impossible comparison items from the transactions; perform empirical scoring on normalizing the plurality of attributes for ranking risky entities; identify the risky entities based on one of the empirical scoring and analytics; and update policies and/or monitoring in the cloud-based system based on the risky entities.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to cloud-based systems and methods for determining security risks of users and groups and addressing the security risks in a cloud-based security system. The systems and methods quantify meaningful risk scores for users or groups of users (e.g., departments, office locations, and organizations) in a normalized manner to remove the transaction count approach which does not provide insight into who is the biggest risk, but who has the most negative events. Once determined, the normalized risk scores can be used by a cloud-based security system (also referred to as a distributed security system) for focused monitoring of particularly risky entities (users or groups of users). The security and access policies in the cloud-based security system can be dynamically adjusted based on continuous or periodically determined normalized risk scores. Accordingly, remediation efforts in the cloud-based security system can be more appropriately targeted. Specifically, the systems and methods enable limited resources in the cloud-based security system to be more appropriately assigned to maximize remediation efforts.

The normalized risk scores can provide security administrators and Chief Information Security Officers (CISOs) of the organization's data to allow dynamic security policies depending on the risks associated with user behaviors. It will also help in prioritizing remediation efforts and ensuring a clean enterprise network. In a multi-tenant (users from various different companies, enterprises, entities, etc.) cloud-based security system, normalized risk scores for users and groups or users (clustered by departments, locations, organizations as an example) can be compared for benchmarking purposes as well as for focused remediation in the cloud-based security system.

§ 1.0 Example High-Level System Architecture—Cloud-Based Security System

Figure 1:
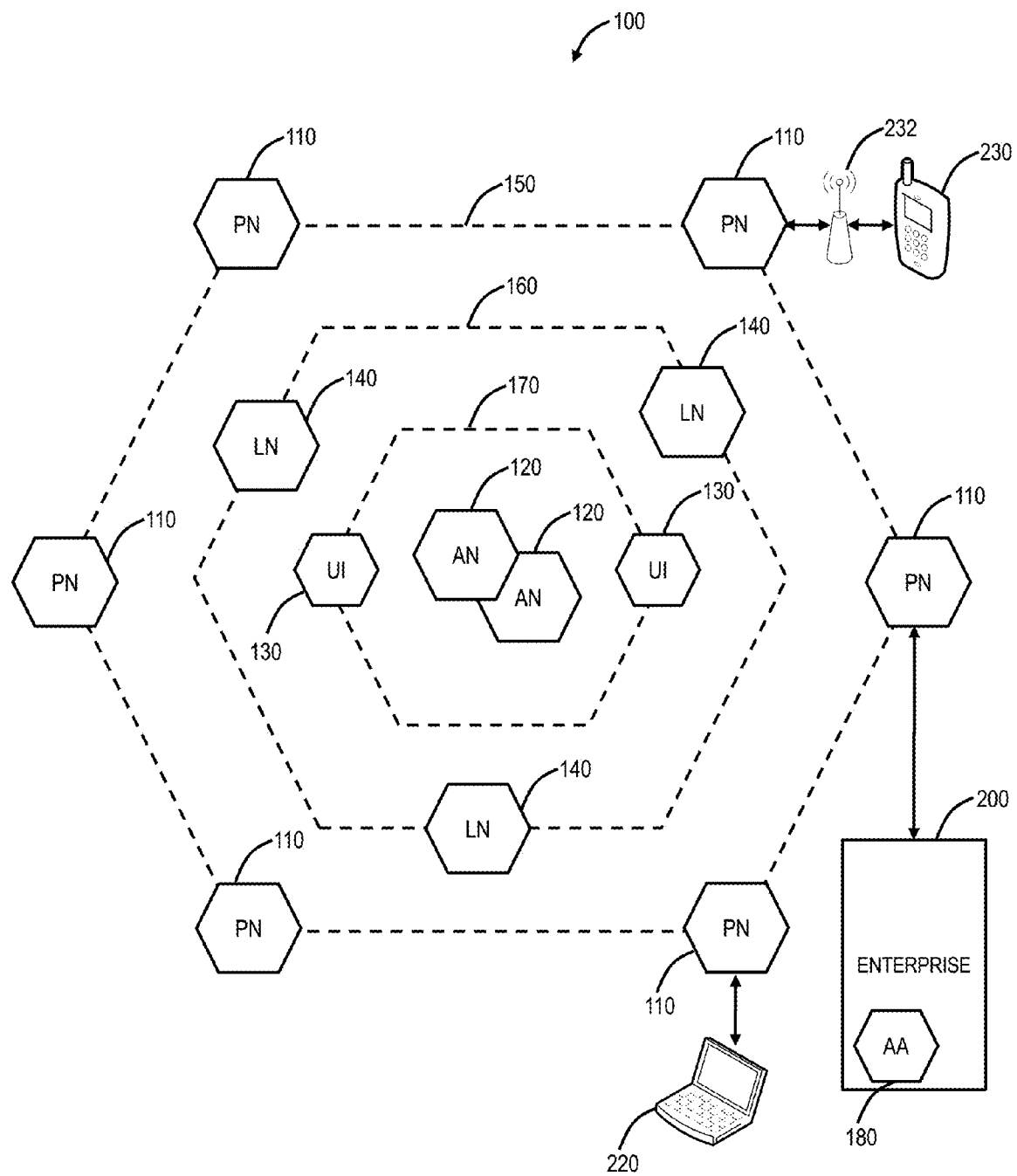
FIG. 1 is a network diagram of a distributed security system.

Referring to FIG. 1, in an exemplary embodiment, a block diagram illustrates a distributed security system 100. The system 100 may, for example, be implemented as an overlay network in a wide area network (WAN), such as the Internet, a local area network (LAN), or the like. The system 100 includes processing nodes (PN) 110, that proactively detect and preclude the distribution of security threats, e.g., malware, spyware, viruses, email spam, Data Leakage Prevention (DLP), content filtering, etc., and other undesirable content sent from or requested by an external system. The processing nodes 110 can also log activity and enforce policies, including logging changes to the various components and settings in the system 100. Example external systems may include an enterprise or external system 200, a computer device 220, and a mobile device 230, or other network and computing systems communicatively coupled to the system 100. In an exemplary embodiment, each of the processing nodes 110 may include a decision system, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only email, only executable files, etc., is process through one of the processing node 110.

Each of the processing nodes 110 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an exemplary embodiment, the threat classification may be reduced to a subset of categories, e.g., violating, non-violating, neutral, unknown. Based on the subset classification, the processing node 110 may allow distribution of the content item, preclude distribution of the content item, allow distribution of the content item after a cleaning process, or perform threat detection on the content item. In an exemplary embodiment, the actions taken by one of the processing nodes 110 may be determinative on the threat classification of the content item and on a security policy of the external system to which the content item is being sent from or from which the content item is being requested by. A content item is violating if, for any part $C=[c1, c2, \ldots, cm]$ of the content item, at any of the processing nodes 110, any one of the data inspection engines generates an output that results in a classification of "violating."

Figure 3:
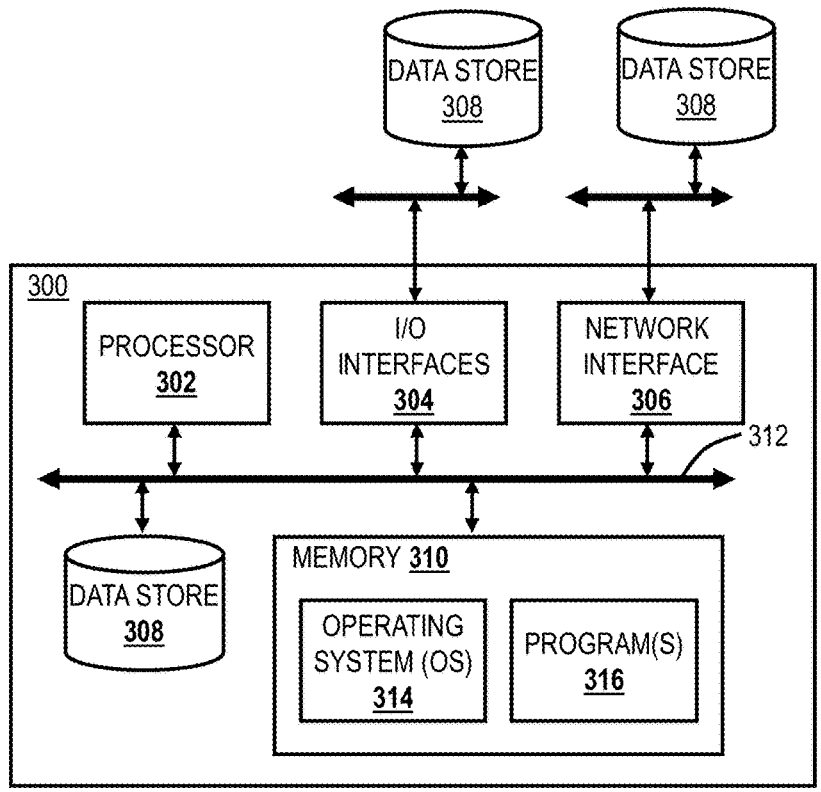
FIG. 3 is a block diagram of a server which may be used in the distributed security system of FIG. 1 or with any other cloud-based system.

Each of the processing nodes 110 may be implemented by one or more of computer and communications devices, e.g., server computers, gateways, switches, etc., such as the server 300 described in FIG. 3. In an exemplary embodiment, the processing nodes 110 may serve as an access layer 150. The access layer 150 may, for example, provide external system access to the security system 100. In an exemplary embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc. may be configured to establish communications through the nearest (in traffic communication time, for example) processing node 110. A mobile device 230 may be configured to communicate to the nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an exemplary embodiment, the processing nodes 110 may communicate with one or more authority nodes (AN) 120. The authority nodes 120 may store policy data for each external system and may distribute the policy data to each of the processing nodes 110. The policy may, for example, define security policies for a protected system, e.g., security policies for the enterprise 200. Example policy data may define access privileges for users, websites and/or content that is disallowed, restricted domains, etc. The authority nodes 120 may distribute the policy data to the processing nodes 110. In an exemplary embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may be implemented by push and pull distribution schemes described in more detail below. In an exemplary embodiment, each of the authority nodes 120 may be implemented by one or more computer and communication devices, e.g., server computers, gateways, switches, etc., such as the server 300 described in FIG. 3. In some exemplary embodiments, the authority nodes 120 may serve as an application layer 170. The application layer 170 may, for example, manage and provide policy data, threat data, and data inspection engines and dictionaries for the processing nodes 110.

Other application layer functions may also be provided in the application layer 170, such as a user interface (UI) front-end 130. The user interface front-end 130 may provide a user interface through which users of the external systems may provide and define security policies, e.g., whether email traffic is to be monitored, whether certain websites are to be precluded, etc. Another application capability that may be provided through the user interface front-end 130 is security analysis and log reporting. The underlying data on which the security analysis and log reporting functions operate are stored in logging nodes (LN) 140, which serves as a data logging layer 160. Each of the logging nodes 140 may store data related to security operations and network traffic processed by the processing nodes 110 for each external system. In an exemplary embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used. Note, as described herein, the systems and methods for tracking and auditing changes in a multi-tenant cloud system can be implemented in the data logging layer 160, for example.

In an exemplary embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an exemplary embodiment, the processing node 110 may act as a forward proxy that receives user requests to external servers addressed directly to the processing node 110. In another exemplary embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an exemplary embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other Internet Protocol (IP) security protocols may be used. In another exemplary embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise, the access agent 180 may be configured to perform MPLS labeling. In another transparent proxy mode exemplary embodiment, a protected system, such as the enterprise 200, may identify the processing node 110 as a next hop router for communication with the external servers.

Generally, the distributed security system 100 may generally refer to an exemplary cloud-based security system. Other cloud-based security systems and generalized cloud-based systems are contemplated for the systems and methods for tracking and auditing changes in a multi-tenant cloud system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security system 100 is illustrated herein as one exemplary embodiment of a cloud-based system, and those of ordinary skill in the art will recognize the tracking and auditing systems and methods contemplate operation on any cloud-based system.

§ 2.0 Example Detailed System Architecture and Operation

Figure 2:
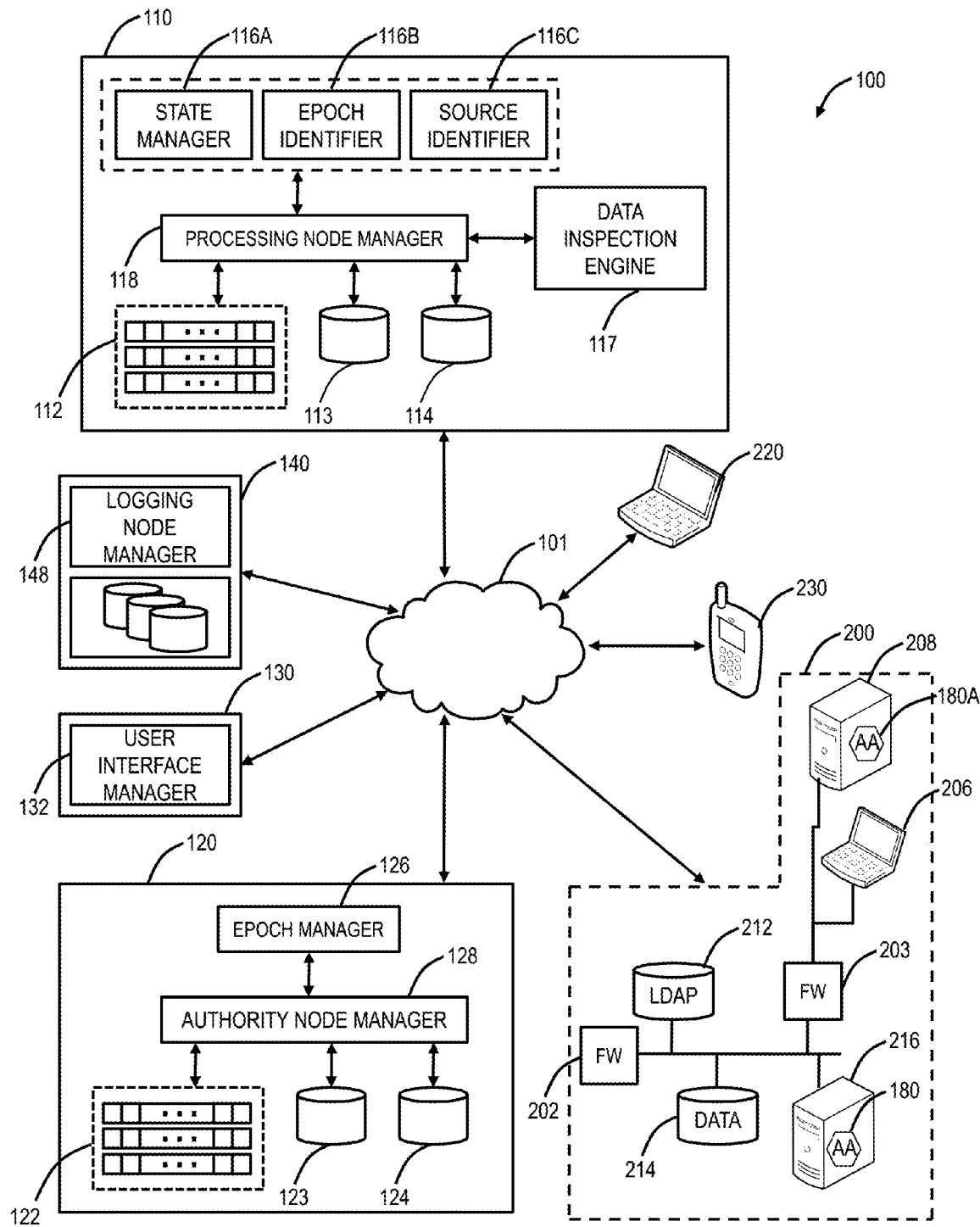
FIG. 2 is a network diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 to one another. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a lightweight directory access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include user identifiers, login passwords, and a login history associated with each user identifier. The other data stores 214 may include sensitive information, such as bank records, medical records, trade secret information, or any other information warranting protection by one or more security measures.

In an exemplary embodiment, a client access agent 180a may be included on a client computer 206. The client access agent 180a may, for example, facilitate security processing by providing a hash index of files on the user computer 206 to a processing node 110 for malware, virus detection, etc. Other security operations may also be facilitated by the access agent 180a. In another exemplary embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180b. The computer device 220 and the mobile device 230 may also store information warranting security measures, such as personal bank records, medical information, and login information, e.g., login information to the computers 206 of the enterprise 200, or to some other secure data provider server. The computer device 220 and the mobile device 230 can also store information warranting security measures, such as personal bank records, medical information, and login information, e.g., login information to a server 216 of the enterprise 200, or to some other secure data provider server.

§ 2.1 Example Processing Node Architecture

In an exemplary embodiment, the processing nodes 110 are external to network edges of the external systems 200, 220 and 230. Each of the processing nodes 110 stores security policy data 113 received from the authority node 120 and monitors content items requested by or sent from the external systems 200, 220 and 230. In an exemplary embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to validate further the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, the absence of information, while a one in that bit position can indicate the presence of information. Alternatively, a one could be used to represent absence, and a zero to represent presence. Each content item may have an information key that is hashed. For example, the processing node manager 118 may identify the Uniform Resource Locator (URL) address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves the performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position, and that bit position indicates that the requested information is absent when it is actually present.

§ 2.2 Example Authority Node Architecture

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from processing nodes 110 when the processing node 110 has processed a content item and update the master detection processing filter 122. For example, the master detection processing filter 122 may be distributed to the processing nodes 110, which then stores a local copy of the detection processing filter 112.

In an exemplary embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an exemplary embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, a list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then stores a local copy of the threat data 114. In another exemplary embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 120.

§ 2.3 Example Processing Node and Authority Node Communications

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined not to be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined not to be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 113 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114.

The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process and transmits the threat data update to one of the authority nodes 120.

The authority node manager 128, in turn, may update the master threat data 124 and the master detection process filter 122 stored in the authority node data store according to the threat data update received from the processing node 110. In an exemplary embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 113 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated by the present invention. The data inspection engines 116, processing node manager 118, authority node manager 128, user interface manager 132, logging node manager 148, and access agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer readable medium. Other processing architectures can also be used, e.g., a combination of specially designed hardware and software, for example.

§ 3.0 Exemplary Server Architecture

Referring to FIG. 3, in an exemplary embodiment, a block diagram illustrates a server 300 which may be used in the system 100, in other systems, or standalone. Any of the processing nodes 110, the authority nodes 120, and the logging nodes 140 may be formed through one or more servers 300. Further, the computer device 220, the mobile device 230, the servers 208, 216, etc. may include the server 300 or similar structure. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate over a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

§ 4.0 Exemplary Mobile Device Architecture

Figure 4:
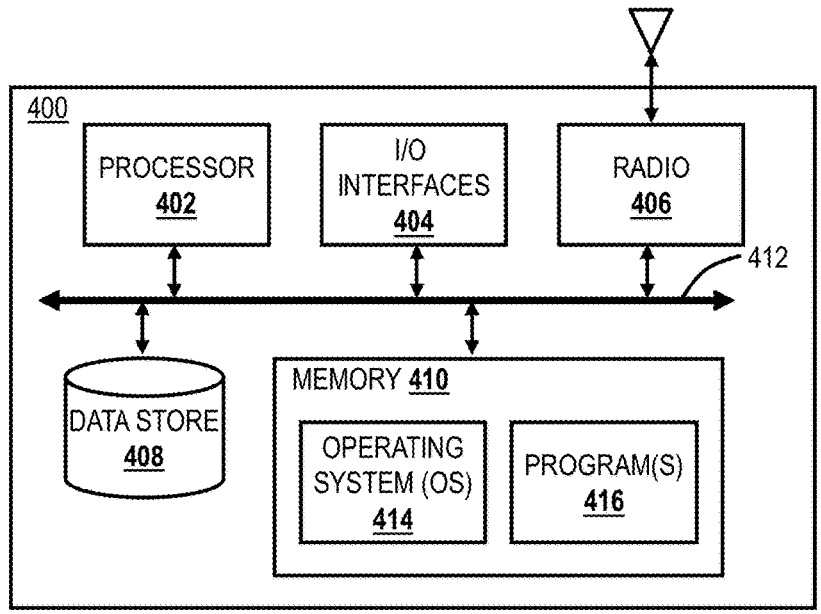
FIG. 4 is a block diagram of a mobile device which may be used in the system of FIG. 1 or with any other cloud-based system.

Referring to FIG. 4, in an exemplary embodiment, a block diagram illustrates a mobile device 400, which may be used in the system 100 or the like. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the mobile device 400 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example, but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 402 is configured to execute software stored within the memory 410, to communicate data to and from the memory 410, and to generally control operations of the mobile device 400 pursuant to the software instructions. In an exemplary embodiment, the processor 402 may include an optimized mobile processor such as optimized for power consumption and mobile applications. The I/O interfaces 404 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 400. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs and provides scheduling, input-output control, file and data management, memory management, and communication control and related services. The programs 416 may include various applications, add-ons, etc. configured to provide end user functionality with the mobile device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

§ 5.0 Exemplary General Cloud System

Figure 5:
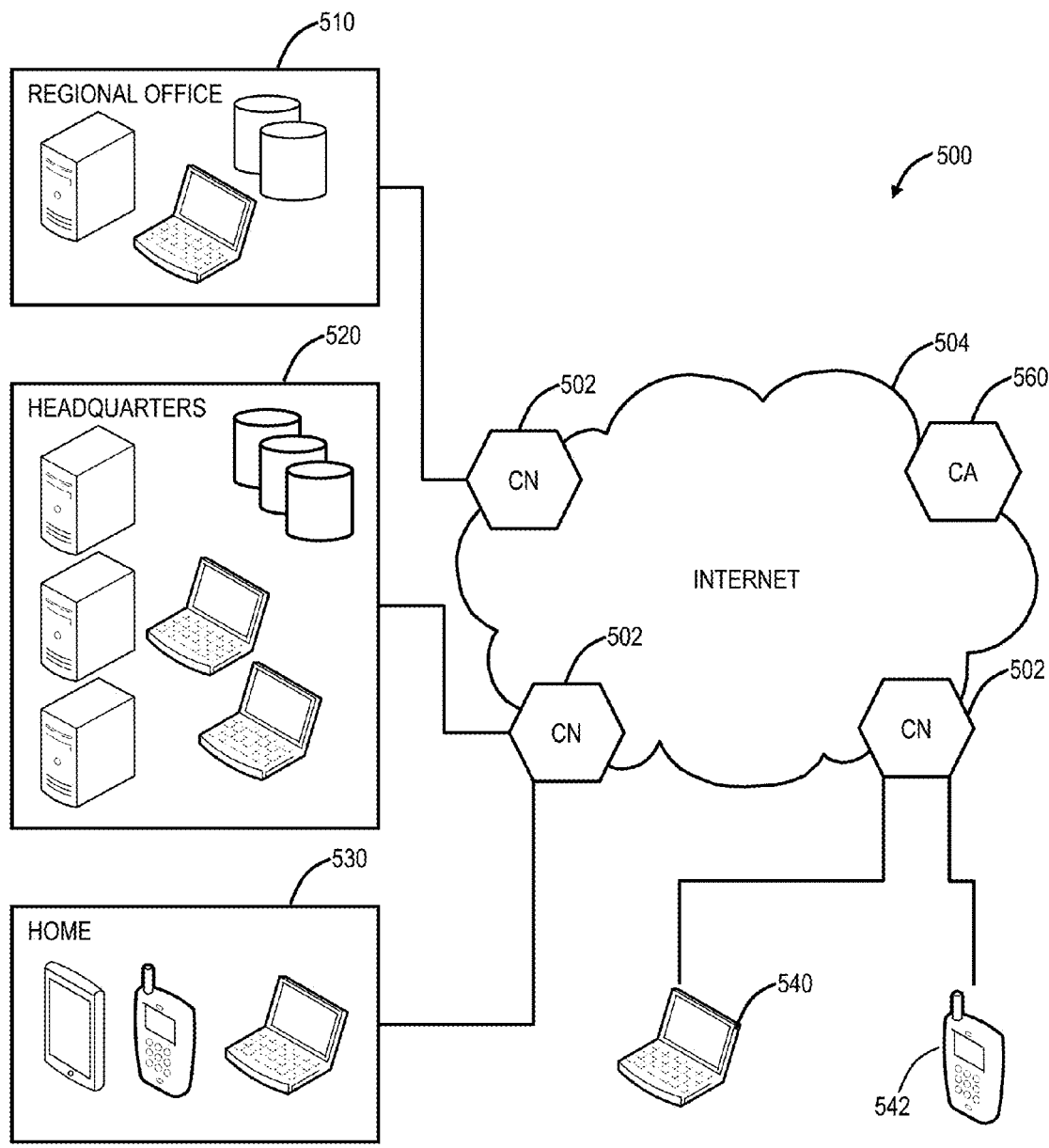
FIG. 5 is a network diagram of a generalized cloud-based system.

Referring to FIG. 5, in an exemplary embodiment, a cloud system 500 is illustrated for implementing the systems and methods described herein for tracking and auditing changes in a multi-tenant cloud system. The cloud system 500 includes one or more cloud nodes (CN) 502 communicatively coupled to the Internet 504. The cloud nodes 502 may include the processing nodes 110, the server 300, or the like. That is, the cloud system 500 may include the distributed security system 100 or another implementation of a cloud-based system, such as a system providing different functionality from security. In the cloud system 500, traffic from various locations (and various devices located therein) such as a regional office 510, headquarters 520, various employee's homes 530, mobile laptop 540, and mobile device 542 communicates to the cloud through the cloud nodes 502. That is; each of the locations 510, 520, 530, 540, 542 is communicatively coupled to the Internet 504 through the cloud nodes 502. For security, the cloud system 500 may be configured to perform various functions such as spam filtering, uniform resource locator (URL) filtering, antivirus protection, bandwidth control, data loss prevention, zero-day vulnerability protection, web 2.0 features, and the like. In an exemplary embodiment, the cloud system 500 and the distributed security system 100 may be viewed as Security-as-a-Service through the cloud. In general, the cloud system 500 can be configured to perform any function in a multi-tenant environment. For example, the cloud system 500 can provide content, a collaboration between users, storage, application hosting, and the like.

In an exemplary embodiment, the cloud system 500 can utilize the systems and methods for tracking and auditing changes in a multi-tenant cloud system. That is, the cloud system 500 can track and audit administrator activity associated with the cloud system 500 in a segregated and overlaid fashion from the application functions performed by the cloud system 500. This segregated and overlaid fashion decouples the tracking and auditing from application logic, maximizing resources and minimizing development complexity and runtime processing. The cloud system 500 (and the system 100) can be offloaded from complex tracking and auditing functions so that it can provide its primary function. In the context of a distributed security system, the tracking and auditing systems and methods enable accountability, intrusion detection, problem diagnosis, and data reconstruction, all in an optimized fashion considering the exponential growth in cloud-based systems.

§ 6.0 DNS Augmented Security

In an exemplary embodiment, the cloud system 500 and/or the distributed security system 100 can be used to perform DNS surrogation. Specifically, DNS surrogation can be a framework for distributed or cloud-based security/monitoring as is described herein. Endpoint security is no longer effective as deployments move to the cloud with users accessing content from a plurality of devices in an anytime, anywhere connected manner. As such, cloud-based security is the most effective means to ensure network protection where different devices are used to access network resources. Traffic inspection in the distributed security system 100 and the cloud-based system 500 is performed in an in-line manner, i.e. the processing nodes 110 and the cloud nodes 502 are in the data path of connecting users. Another approach can include a passive approach to the data path. DNS is one of the most fundamental IP protocols. With DNS surrogation as a technique, it is proposed to use DNS for dynamic routing of traffic, per-user authentication and policy enforcement, and the like.

In conjunction with the cloud system 500 and/or the distributed security system 100, various techniques can be used for monitoring which is described on a sliding scale between always inline to never inline. First, in an always inline manner, all user traffic is between inline proxies such as the processing nodes 110 or the cloud nodes 502 without exception. Here, DNS can be used as a forwarding mechanism to the inline proxies. Second, in a somewhat always inline manner, all user traffic except for certain business partners or third parties is between inline proxies such as the processing nodes 110 or the cloud nodes 502. Third, in an inline manner for most traffic, high bandwidth applications can be configured to bypass the inline proxies such as the processing nodes 110 or the cloud nodes 502. Exemplary high bandwidth applications can include content streaming such as video (e.g., Netflix, Hulu, YouTube, etc.) or audio (e.g., Pandora, etc.). Fourth, in a mixed manner, inline monitoring can be used for "interesting" traffic as determined by security policy with other traffic being direct. Fifth, in an almost never inline manner, simple domain-level URL filtering can be used to determine what is monitored inline. Finally, sixth, in a never inline manner, DNS augmented security can be used.

Figure 6:
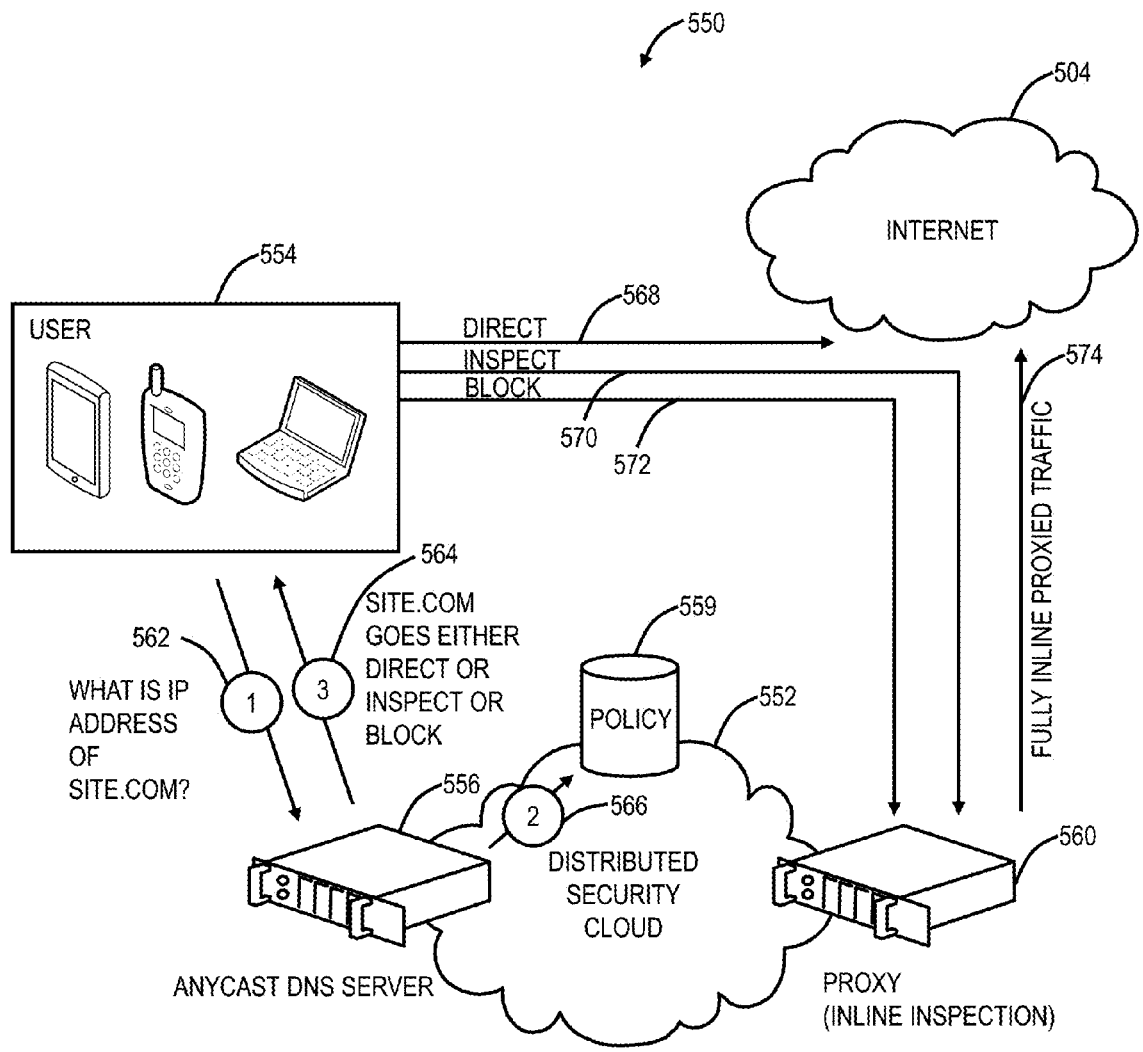
FIG. 6 is a network diagram of a network with a distributed security cloud providing DNS augmented security.

Referring to FIG. 6, in an exemplary embodiment, a network diagram illustrates a network 550 with a distributed security cloud 552 providing DNS augmented security. The network 550 includes a user device 554 connecting to the distributed security cloud 552 via an anycast DNS server 556. The anycast DNS server 556 can be a server such as the server 300 of FIG. 3. Also, the anycast DNS server 556 can be the processing node 110, the cloud node 502, etc. The distributed security cloud 552 includes the anycast DNS server 556, policy data 558, and an inline proxy 560. The inline proxy 560 can include the processing node 110, the cloud node 502, etc. In operation, the user device 554 is configured with a DNS entry of the anycast DNS server 556, and the anycast DNS server 556 can perform DNS surrogation as is described herein. The distributed security cloud 552 utilizes the anycast DNS server 556, the policy data 558, and the inline proxy 560 to perform the DNS augmented security.

The network 550 illustrates the DNS augmented security where DNS information is used as follows. First, at step 562, the user device 554 requests a DNS lookup of a site, e.g. "what is the IP address of site.com?" from the anycast DNS server 556. The anycast DNS server 556 accesses the policy data 558 to determine the policy associated with the site at step 564. The anycast DNS server 556 returns the IP address of the site based on the appropriate policy at step 566. The policy data 558 determines if the site either goes direct (step 568) to the Internet, is inspected by the inline proxy (step 570), or is blocked per policy (step 572). Here, the anycast DNS server 556 returns the IP address with additional information if the site is inspected or blocked. For example, if the anycast DNS server 556 determines the access is direct, the anycast DNS server 556 simply returns the IP address of the site. If the anycast DNS server 556 determines the site is blocked or inspected, the anycast DNS server 556 returns the IP address to the inline proxy 560 with additional information. The inline proxy 560 can block the site or provide fully in line proxied traffic to the site (step 574) after performing monitoring for security.

The DNS augmented security advantageously is protocol and application agnostic providing visibility and control across virtually all Internet-bound traffic. For example, DNS-based protocols include Internet Relay Chat (IRC), Session Initiation Protocol (SIP), Hypertext Transfer Protocol (HTTP), HTTP Secure (HTTPS), Post Office Protocol v3 (POP3), Internet Message Access Protocol (IMAP), etc. Further, emerging threats are utilizing DNS today especially Botnets and advanced persistent threats (APTs). For example, Fast flux is a DNS technique used to hide phishing and malware delivery sites behind an ever-changing network of compromised hosts acting as proxies. The DNS augmented security provides deployment flexibility when full inline monitoring is not feasible. For example, this can be utilized in highly distributed with high bandwidth environments, in locations with challenging Internet Access, etc. The DNS augmented security can provide URL filtering, white/black list enforcement, etc. for enhanced security without content filtering. In this manner, the network 550 can be used with the distributed security system 100 and the cloud system 500 to provide cloud-based security without requiring full inline connectivity.

§ 7.0 Conventional User Risk

Figure 7:
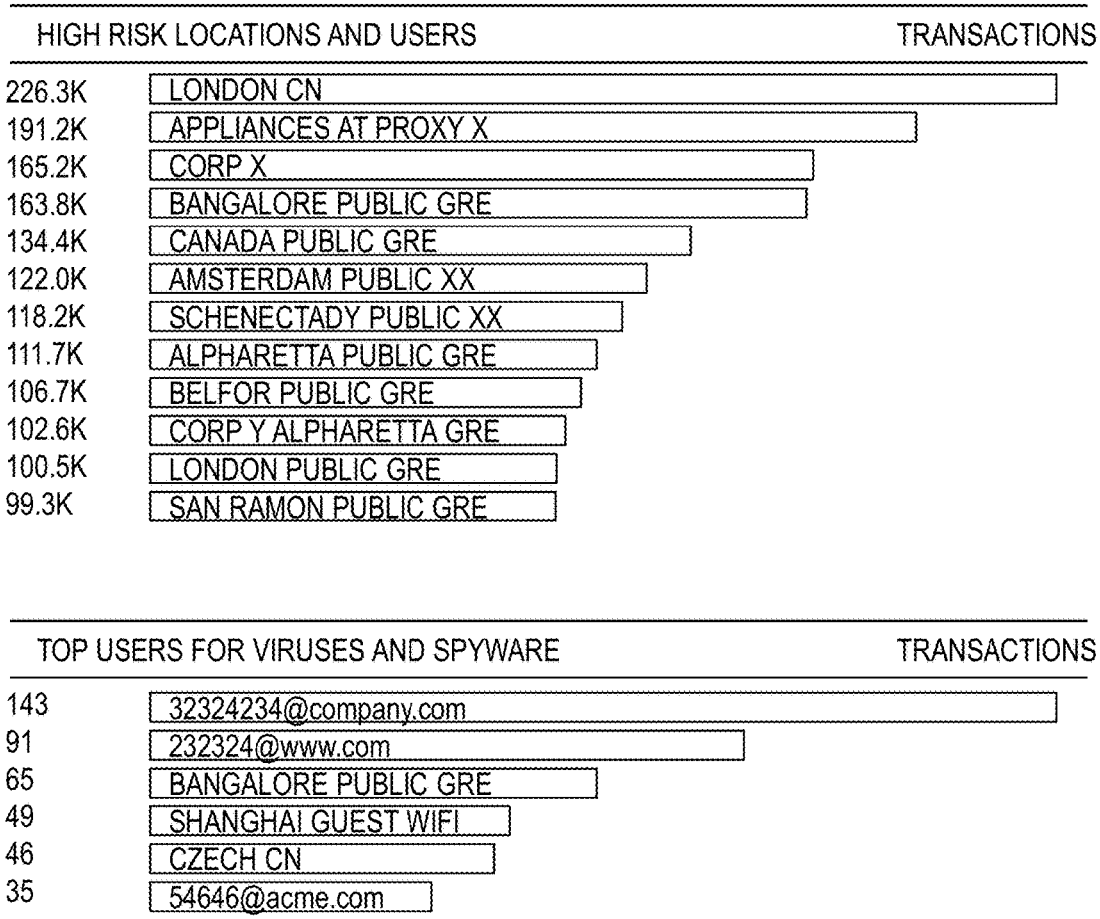
FIG. 7 is a screen shot of the conventional approach to user risk.

Referring to FIG. 7, in an exemplary embodiment, a screen shot illustrates the conventional approach to user risk. Specifically, FIG. 7 includes a bar chart based on transactions listing the high-risk locations and users and the top users for viruses and spyware. Again, the conventional approach relies on transaction counts only. There are significant limitations to the conventional approach. There is no aggregation by threat family, e.g., a noisy botnet can pollute the results leading to high transaction counts based on a single threat—the noisy botnet. There is no prioritization by security event type such as botnets, antivirus blocks, URL blocks, etc. are all treated the same way, by transaction count. The conventional approach is difficult for the distributed security system 100 or the cloud system 500 to identify actual risky users for remediation.

§ 8.0 Normalized User Risk with the Cloud-Based Security System

Figure 8:
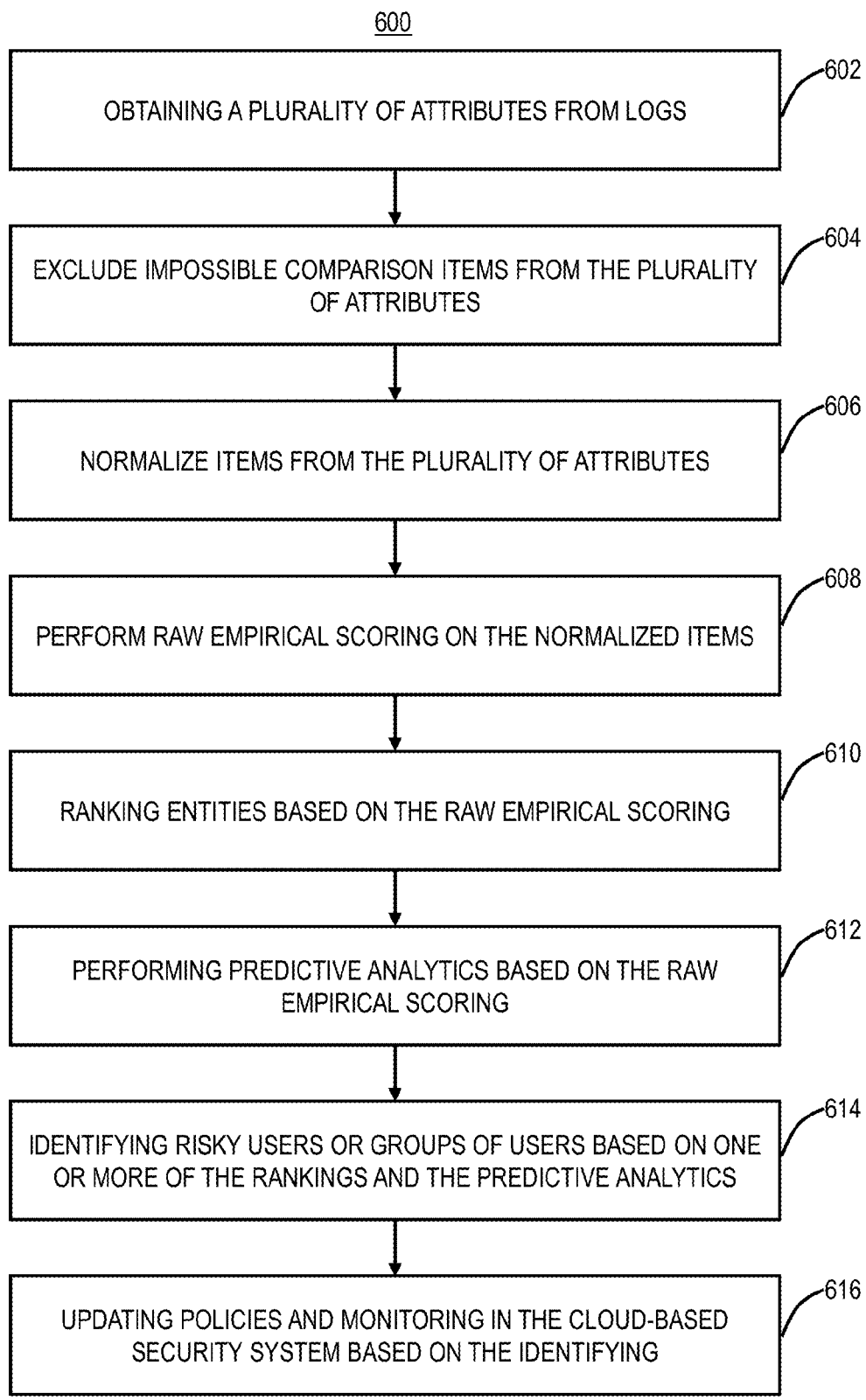
FIG. 8 is a flowchart of a normalized user risk process implemented through the distributed security system of FIG. 1, the cloud system of FIG. 5, and/or the distributed security cloud in FIG. 6 (collectively referred to as a "cloud-based security system")

Referring to FIG. 8, in an exemplary embodiment, a flowchart illustrates a normalized user risk process 600 implemented through the distributed security system 100, the cloud system 500, and/or the distributed security cloud 552 (collectively referred to as a "cloud-based security system"). First, the process 600 includes obtaining a plurality of attributes from logs (step 602). As described herein, the cloud-based security system logs information about transactions during normal operation. The information can include web requests, network flows, etc., and in most cases, a transaction will contain information that relates to a subject, whether the subject is a company, office, internal IP address, actual user, role account, etc. Information for a single transaction can include a plurality of primary attributes including a subject identifier and information about the type(s) of threats related to the transaction and in many cases a URL or the like.

It is also possible to obtain a plurality of secondary attributes from a collection of log entries from the cloud-based security system that can augment the plurality of primary attributes with user attributes and outcomes. Examples of extraction of a secondary user attribute can include parsing of URL's for indications of applications running on a user's device, types of websites they visit, and so on. Examples of secondary outcomes could include "early malware adoption" which indicates downloading of a malware payload before it was categorized as malware, how long it went undetected, etc.

The process 600 can include excluding impossible comparison items from the plurality of attributes (step 604). Again, the cloud-based security system is multi-tenant, and the meaning of log entries varies based on a particular customer's configuration where identical behavior can result in different logs. Disparate configurations can make certain types of log entries impossible for comparison, e.g., subject A and subject B, if the outcome of the commonly encountered log entry for B is negative then even if A exhibits exactly the same behavior, but it's commonly encountered log entry is positive, they will have a lower risk score.

In order to make meaningful empirical comparisons (of security outcomes), the configuration must be taken into account and log entries that are impossible for one subject must be excluded from the computation for all subjects or the comparison is meaningless. Additional constraints must also be considered, such as including geographical distribution of malware campaigns (perhaps a given campaign only affects 10% of users in, e.g., China—if that is the case, the data must be corrected based on geography).

Note, step 604 may be optional and may only be needed to compute normalized risk scores in a multi-tenant system where different entities may have different policies, log configurations, etc. Of course, in the multi-tenant system, if the log configurations are the same across different entities, it is not required to exclude impossible comparison items. Here, the impossible comparison items are ones where disparate log configurations yield different results for the same behavior.

Next, the process 600 includes normalizing items from the plurality of attributes (step 606). When a threat is detected, it is detected every time such as through a detection mechanism in the cloud-based security system. The detection can be a signature, anti-virus, or URL blacklist, etc. which is detected on a transaction. Assume a botnet command and control communication, for example. A botnet is a number of Internet-connected devices communicating with other similar machines in which components located on networked devices communicate and coordinate their actions by command and control (C&C) or by passing messages to one another (C&C might be built into the botnet as P2P). Botnets have been used many times to send spam email or participate in distributed denial-of-service attacks.

Not all botnets are designed the same—some are quieter (only a few connections), and some are noisier (lots of connections,) so a normalization function can be applied to specific subsets of threat types. The outcome of a normalization function will always include a time bucket and a set of unique threats, and measurements of those threats that will include their normalized and raw scores. An example of one such normalization treats over-counting of botnet command-and-control systems by returning a list of unique threats within an arbitrary time bucket of e.g. one day, whatever the raw score was, and a normalized score of 1 (count all equally).

Based on the normalization technique for outcomes and configuration comparisons, it is possible to determine which events are possible across the set of subjects intended for comparison. Using that information, all events that are impossible are excluded (i.e., events which cannot be compared apples-to-apples), and counts can be adjusted based on additional factors like geographical region, etc. Data treatment can usually happen before scoring is computed, but depending on whether the set of subjects to be compared is known ahead of time or not, a choice can be made about when normalization functions are applied and which functions to use.

If normalization functions are applied before scoring, it is necessary to know all factors related to the normalization ahead of time—this saves storage space but decreases flexibility by locking into a fixed number of scenarios for comparison. Alternatively, an implementation may choose a more fine-grained normalization that allows the computation to account for configuration changes dynamically, by sacrificing more storage use. The ultimate flexibility comes from performing the entire normalization from raw logs, on demand, but scalability demands currently make such an approach less implementable.

Next, the process 600 includes performing raw empirical scoring on the normalized items (or on non-normalized items if step 606 is applied after scoring) (step 608). The raw empirical score is the sum of normalized threat counts across all time buckets. This score is effectively unbounded, so this value is not usable for comparison purposes. Next, the process 600 includes ranking entities (users or groups of users) based on the raw empirical scoring (step 610). The ranking is comparative empirical scoring. An example of a ranking function would be to rank each user's Raw Empirical Score to a percentile range such as 20th percentile, where the subject exhibits risk that lies in the bottom 20% of subjects compared.

Next, the process 600 can include performing predictive analytics based on the raw empirical scoring (step 612). The above limitations of Empirical comparison lead to the next step, which can use machine learning techniques to find correlations between sets of user attributes to outcomes, taking into account the configuration and generic constraints that are collected and applied to existing data sets in order to continually improve correlation accuracy. The predictive scoring is intended to provide a way to predict the empirical risk of a given subject, based more on attributes of the subject than on actual measured outcomes. In principle, this is very similar to the concept of a so-called "credit score," where similar predictions are made, but regarding the likelihood that a subject will meet some hypothetical debt obligation.

Next, the process 600 includes identifying risky users or groups of users based on one or more of the rankings and the predictive analytics (step 614). In an exemplary embodiment, scores are consumed via an API that permits a customer to query a database that maintains subject score information at both predictive and empirical levels. The intent of this API is to permit customers to make use of risk scores to make access control decisions for applications not otherwise related to Internet use or the like. The same scores can also be used by a service provider, as policy inputs for other services, like a meet-in-the-middle proxy that provides access to certain customer internal resources.

Finally, the process 600 includes updating policies and monitoring in the cloud-based security system based on the identifying (step 616). Note, the process 600 can be run periodically to provide updated scores, which can also be maintained over time to determine changes in risk. Once an iteration of the process 600 is complete, the normalized risk scores can provide information of which entities (users or groups of users) are the most susceptible to risk, not an actual risk and not simply entities with high negative transaction counts. The identifying can be used in the cloud-based security system to update policies and/or monitoring intensity on the entities most susceptible to risk.

For example, a mobile device user may be excluded from an enterprise network through the cloud-based security system based on the identifying. In another example, a user may be sandboxed and given limited access through the cloud-based security system based on the identifying. Thus, various adjustments to policy are contemplated for entities based on the identifying. Generally, policies include what the entities are allowed to do through the cloud-based security system. The monitoring can be intensified on the entities, for example, providing different levels of monitoring through the cloud-based security system, or the like.

§ 8.1 Obtaining Log Data from the Cloud-Based Security System

In an exemplary embodiment, the process 600 can include the use of a scripting language such as Structured Query Language (SQL) or variants thereof to fetch data from the logs. Note, the logs can include a massive amount of data, for thousands to millions to even billions of users or groups of users associated with the cloud-based security system. Thus, the process 600 includes efficient techniques to obtain the data from the logs. The information required may include user information [user, company, location, department, etc.], security policy name or identifier, and threat information for blocked transaction [threat name, host, server IP, etc.]. In an exemplary embodiment, the process 600 can only consider authenticated users to provide a more actionable and comparable report.

§ 8.2 Normalized Risk Process—Empirical Scoring

In a first approach for empirical scoring in the process 600, all input security policies can be treated equivalent. For example, security policies can include infected, malware, suspicious, virus scanning failures, etc. That is, the security policies map security events into categories. In this first approach, all security policies are treated the same without weightings thus each policy violation is handled equivalently. The empirical scoring for each user or group of users is computed based on a measure of variance (any standard measurement of variance) from a mean based on a location, a company, a department, etc. The computation of the empirical score for an entity (a user or group of users) is the malicious to clean ratio which can be determined as $$\text{Empirical score} = \frac{\text{score} - \text{mean}}{\text{standard deviation}}$$

Where the score is the number of policy violations in a category for a time period, the mean is the average number of policy violations in the category for the time period for a comparison group, and the standard deviation is the standard deviation from the mean for the comparison group (or any other measure of variation). Here, the empirical score is computed for the entity and the comparison group can be a department, location, company, etc. This first approach has the advantage of ignoring the volume of policy violations and instead focusing on user behavior relative to peers. However, based on observations, the first approach has scores that were not normally distributed, and the results were difficult to utilize.

Thus, the lack of normal distribution led to a second approach which 1) considers only authenticated transactions for risk calculation, 2) categorizes policy violations based on security policy and applies modifiable weightings thereto, 3) aggregates transactions to overall risk using entity categorization, 4) applies a weighting for the amount of time a violation is present, and 5) weights by optional categories such as department, company, etc. In an exemplary embodiment, the entity categorization can be based on threat name, server IP address, hostname, etc. to provide aggregation of transactions. In an exemplary embodiment, the policy violations categorized based on security policy can be categorized as infected with a weight of 1.5, malware with a weight of 1.0, and suspicious with a weight of 0.5. Thus, infected has the highest weight, malware has a middleweight, and suspicious has a lower weight, which reflects the overall potential harm each violation could have.

The empirical scoring can include adjusting a raw score in a time period based on minimum values, maximum values, and a plurality of quantiles. Specifically, it was determined that the measured variance could be infinite due to a skewed distribution. So, instead of using a mean or standard deviation for normalization, the systems and methods look at an entity as a whole and consider the maximum value and the minimum value and then assign quantiles, such as at sensible places to put barriers to get some categorization, such as normal, medium risk, and high risk, or any other quantile distribution.

The infected category includes traffic indicative of a particular type of malware infection such as botnet command and control activity. Accordingly, the infected category represents the highest level of risk. The malware category includes transactions associated with policy violations related to attempts to download malware such based on behavioral analysis, antivirus detection, or a match in a URL database. The malware category can also include web exploit attempts. Thus, the malware category captures behavior related to getting infected and represents less risk than the infected category. The suspicious category relates to merely suspicious traffic such as anonymizers, tunneling attempts, cookie-stealing, cross-site scripting (XSS), ActiveX, DLP events, etc. That is, the suspicious category relates to poor behavior, but it is not as severe as the infected category or the malware category. Also, scanning failures are ignored such as where the cloud-based security system detects a weird file that is not malware, or the like.

The cloud-based security system performs scanning as described herein. The following provide examples of policy events that are added to the score for each category.

Infected Category

| | |
|---|---|
| Botnet request denied | Botnet Command & Control request denied |
| Botnet Command & Control response denied | |

Malware Category

| | |
|---|---|
| Virus block | Malware request denied |
| Phishing request denied | Malware response denied |
| Phishing response denied | Trojan (WRI) response denied |
| Ad/spyware response denied | Ad/spyware request denied |
| Browser exploit denied | Behavioral Analysis quarantined |

Suspicious Category

| | |
|---|---|
| Blacklisted | DLP denied |
| ActiveX response denied | XSS response attempt denied |
| Cookie-steal denied | IRC tunneling denied |
| Anonymizer denied | Worm denied |
| Worm warned | Peer-to-Peer (P2P) denied |
| Spam denied | Defined category denied |
| Geolocation denied | Personal Identifiable Information (PIT) denied |
| Device denied | Third party communication denied |
| Vulnerable denied | Tunnel denied |
| Fake proxy authentication denied | Insecure communication denied |
| Encrypted attachment dropped | Antivirus encryption dropped |
| Unzippable attachment dropped | Bulk attachment dropped |

§ 8.3 Pseudocode for Exemplary Empirical Scoring

The following pseudo code can provide an example of obtaining relevant data based on a scripting language on a log.

```
FROM weblog
SELECT locationID, companyID, departmentID, userID, TN, policy
    simp, day, count(1)
WHERE policy in (6, 7, 8, 9, 10, 26, 58, 21, 23, 24, 25, 59, 82,
    83, 84, 85, 86, 87, 88, 89, 11, 20, 22, 27, 28, 32, 33, 34,
    35, 38, 56, 57, 60, 64, 65, 66, 67, 70, 74, 75, 77, 78, 43,
    62, 63, 72, 73, 29, 30, 31)
GROUP BY
    CASE
    WHEN policy in (6, 7, 8, 9, 10) then "virus_scan_fail"
    WHEN policy in (26, 58, 21, 23, 24, 25, 59) then "infected"
    WHEN policy in (82, 83, 84, 85, 86, 87, 88, 89) then
        "malware"
    WHEN policy in (11, 20, 22, 27, 28, 29, 30, 31, 32, 33, 34,
        35, 38, 56, 57, 60, 64, 65, 66, 67, 70, 74, 75, 77,
        78, 43, 62, 63, 72, 73) then "suspicious"
    ELSE "ignore"
    END policy simp
```

```
CASE
    WHEN threatname != "NA" then threatname
    WHEN itoa(serverip) != "0" then itoa(serverip)
    WHEN 1 != 1 then hostname
    ELSE "ignore"
    END TN
    locationID, companyID, departmentID, userID, (time/86400)
    day
COPY TO "output"
```

The output of the above pseudocode provides a count by day and by the categorization described herein of policy events ("score"). When running on operational log data with billions of transaction, the runtime of queries is a function of data size and ran between about 5-25 minutes. Thus, it is envisioned the obtaining can be done periodically, even daily.

The pseudo-code aggregates as follows:

```
POLICY_SIMP
    Simplified Policy (INFECTED, MALWARE, SUSPICIOUS, etc.)
THREAT
    Threat Name        (if it exists)
    Server IP          (if it exists)
    Hostname           (if no other option exists)
    DAYS since epoch   (repeating THREAT)
USER IDENTITY
    LocationID, CompanyID, DepartmentID, & UserID
```

Thus, the output of the pseudocode is a unique threat for every day that it has existed for the userID. A secondary query can be run to filter out unauthenticated users, e.g., userID !=locationID).

Figure 9:
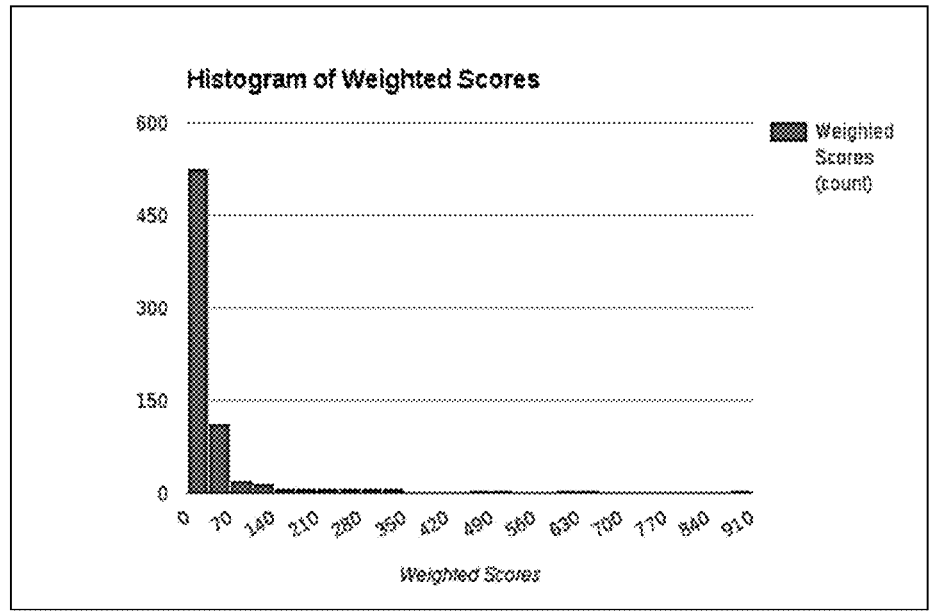
FIGS. 9 and 10 are graphs of exemplary results from the process of FIG. 8 with a histogram of scores for one month (FIG. 9) and a histogram of LOG scores for one month (FIG. 10)
Figure 10:
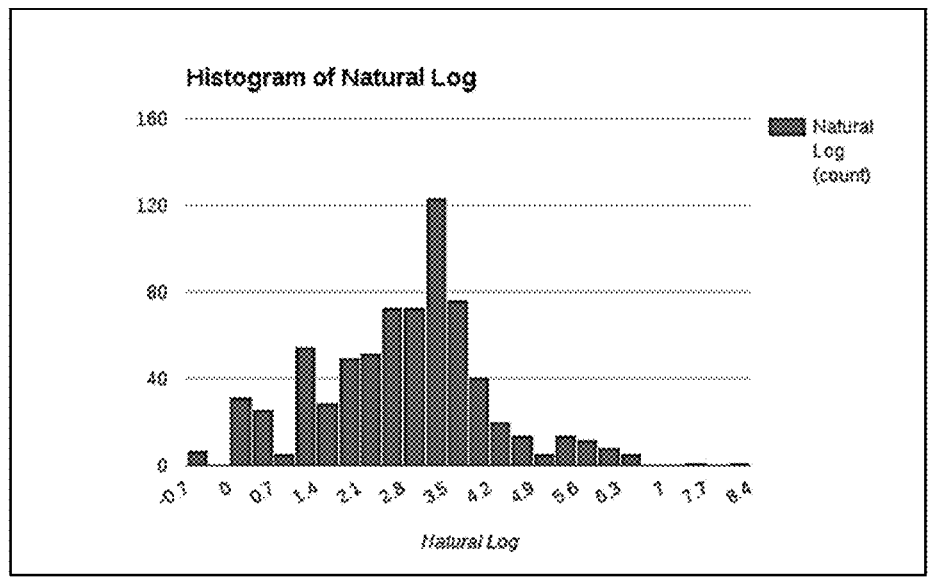

With the output, empirical scoring can be performed. For example, a pivot can be performed on the output to classify counts into categories, the weights can be applied, and the top N can be computed by the score. This step takes seconds for an entire months' worth of data. The risk score for a userID can be computed as:

Risk Score=Infected*1.5*Days of activity+
Malware*1.0*Days of activity+
Suspicious*0.5*Days of activity Referring to FIGS. 9 and 10, in an exemplary embodiment, graphs illustrate exemplary results from the process 600 with a histogram of scores for one month (FIG. 9) and a histogram of LOG scores for one month (FIG. 10). Knowing the distributions gives predictive power to the cloud-based security system. Note, FIG. 9 looks like an exponential distribution which has been determined as accurate, and FIG. 10 shows a natural LOG of scores which is properly a normal distribution as expected. More specifically, FIG. 9 closely resembles a Pareto distribution. Thus, it is observed that the risk of users follows or resembles the Pareto distribution. For the Pareto distribution, the process 600 measures how many different ailments (security threats) a user suffers and assuming the same probability per ailment, one would expect the number of users suffering from 1, 2, 3, etc. of the ailments at once to decrease by a factor of two for every added ailment. In FIG. 10, in the normal distribution, the standard deviation is 1.40, the mean is 3.12, the maximum risk score is 3.73, and the minimum risk scores is −2.73.

From this data, the cloud-based security system can utilize insights, machine learning, etc. to both optimize its performance as well as report risks and threats to IT personnel. For example, insights can include what can be done about the number of XYZ infections over populations that cannot be fully measured? By industry? By country? Etc. What percentage of users are riskier than me, i.e., like a credit score for computer risk? What percentage of peer companies are riskier than me? Is a new detection signature in the cloud-based security system working properly?

From the perspective of remediation with the cloud-based security system, there are various aspects based on the scoring from the process 600. For example, for a new detection signature, the scores can show its success, and if it is not behaving properly, adjustments can be made accordingly and compared based on subsequent scores. For specific users, based on the scores from the process 600, additional attention can be provided in the monitoring of the cloud-based security system as well as new policies to proactively address the risk (e.g., preventing access to an enterprise network if a specific device is risky). Those of ordinary skill in the art will appreciate the policies can be anything where the cloud-based security system allows/denies transactions, communications, etc. between anything.

In a multi-tenant environment, the cloud-based security system provides vast insight into the process 600 of the overall state of network security, worldwide. Thus, with real, normalized empirical data, it is possible to proactively remediate risks including zero-day, zero-hour detection, analysis, and remediation.

One aspect of the process 600 is that it is well understood that the distribution of risk should be exponential while the distribution on a LOG scale should be based on the normal distribution. As such, the process 600 accurately reflects these probability curves, thus providing better insight than the conventional counting approaches. It is also contemplated to add/remove policy events, fine-tune the weighting, etc. over time as appropriate to better reflect reality.

Figure 11:
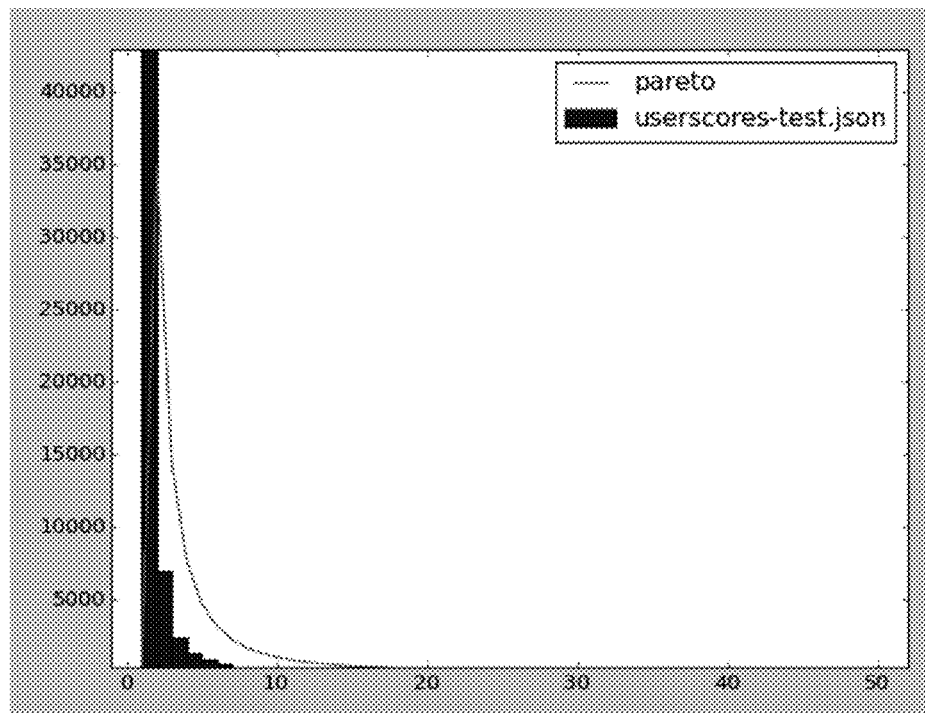
FIGS. 11 and 12 are graphs of additional exemplary results from the process of FIG. 8 with a histogram of scores (FIG. 11) and a histogram of LOG scores (FIG. 12)
Figure 12:
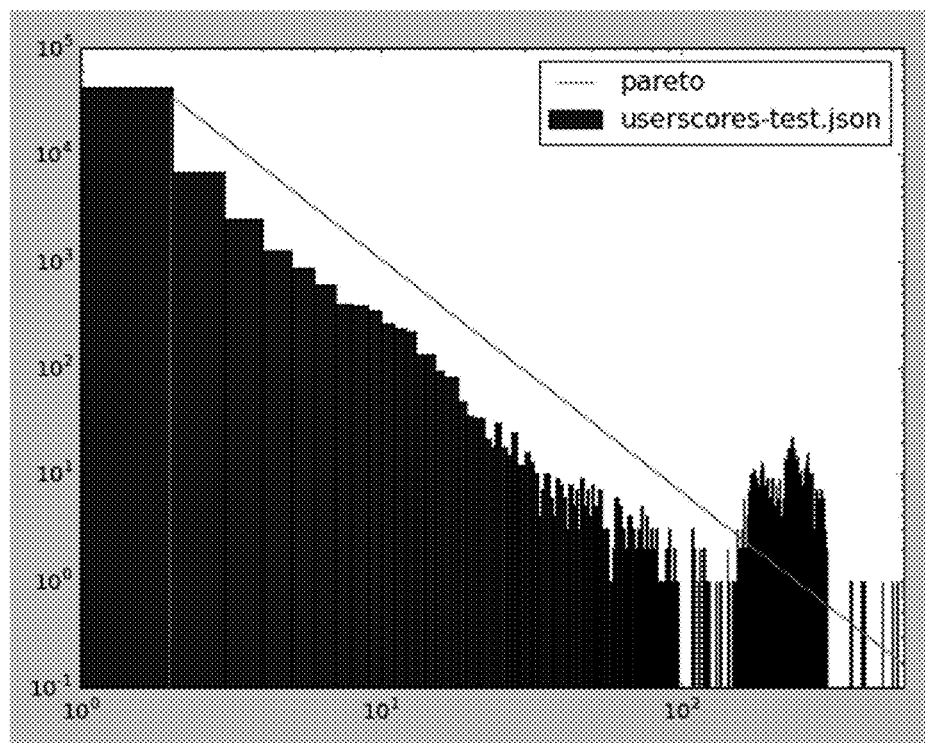

Referring to FIGS. 11 and 12, in an exemplary embodiment, graphs illustrate additional exemplary results from the process 600 with a histogram of scores (FIG. 11) and a histogram of LOG scores (FIG. 12). As seen herein, the raw scores themselves definitely do not conform to a log-normal distribution (where the log of the scores is normally distributed.) On a linear scale, the distribution looks like the graph if FIG. 11 (one can see the bars going really high toward the left and dropping down very rapidly as one moves to the right.) The attached graph in FIG. 11 is zoomed to see the bars better. Without zooming, there is just a bit of a dark vertical line on the left, followed by a bit toward the bottom as it moves to the right. Note that the first bar is clipped quite a bit, also.

When displayed on a log-log scale in FIG. 12, the measured scores and the model probability distribution function (based on assuming a Pareto distribution) are pretty close to each other and that the trend is a straight line, as one would expect of something with a Pareto distribution. The time frame for both diagrams is approximately 5 days on a single cloud.

§ 9.0 Risk Score

An objective of the risk score is to provide a mechanism for customers (IT administrators, etc.) to quickly determine which companies, users, or groups have been victimized or have had near-misses that otherwise would have resulted in victimization by malware or other means. Past efforts have focused on measuring the undesirable traffic generated or looking at a number of blocked transactions. Disadvantageously, these approaches only look at absolute terms which do not provide an accurate view.

Logically and for illustration purposes, assume we ignore what threats really mean and just think of them as an output of black boxes with configurable knobs—a virulence knob that decides how evil and effective a threat is, a target list that indicates which site(s) the box will communicate with about its nefarious activities, and a frequency knob that decides how often the box will communicate with the sites. For example, the black boxes could be "clicking on a dangerous link," "calling home to a Command and Control (C&C) server," etc. For every threat, there is a black box, and for every box, there are some knobs and settings like above.

Now, for evaluating risk, the settings may not necessarily be known in advance, but there are aspects that are known. The virulence knob, for example, is not necessarily related to the frequency knob; there could be a highly virulent threat that is very chatty (high frequency), a mostly harmless one that is very quiet (low frequency), or any other variation in settings. The frequencies are sometimes known, but assuming it is not if the threat can be identified, it is usually enough to know that the threat is present on a given day.

The virulence is often known, for example, post-infection indications and warnings are seen as a clear and present danger to be dealt with immediately and failed malware downloads as less of an issue. There are plenty of sensible ways to categorize threats, but assume three bins for example Post-Infection Behavior, Pre-Infection Behavior, and Suspicious Behavior.

In an exemplary embodiment, systems and methods determine a risk score for a user, a group, a location, an entire company, etc. The risk score is based on security events such as pre-infection behavior (malware), post-infection behavior (infected), suspicious behavior (suspicious), etc. Further, the risk score determination can take into account the length of activity. The risk score determination is applied, for example, to actual users (based on user ID) ignoring location based transactions. Also, the risk score determination can derive uniqueness of security events (e.g., a million njRAT callbacks in a day will still be treated as one active infection). Individual user risk scores can be presented as a raw score, e.g. 1-100, and/or in percentiles (lower 95%—low risk, top 5%—high risk). For example, raw scores such as 1-6 can be low risk whereas scores of 7-100 can be high risk. Also, details of the risk score can be shown for a user, group, company, or location to show how many unique pre-infection behavior (malware), post-infection behavior (infected), suspicious behavior (suspicious) events resulted in the risk score. Also, it is possible to show the actual threats included therein.

In an exemplary embodiment, the risk score is determined based on a variation of:

Risk Score=Weighted Pre-Infection behavior*Days of activity+Weighted Post-Infection behavior*Days of activity+Weighted Suspicious behavior*Days of activity Other embodiments are contemplated, such as square root of the sum of the squares of the aforementioned components. The value can then be converted into percentiles.

§ 9.1 Log Aggregation

Determination of the risk score can be based on analysis of logs. For example, the risk score can be determined in the distributed security system 100 via the logging node 140. Again, the logging nodes 140 serve as the data logging layer 160 in the distributed security system 100. The logging nodes 140 can maintain a significant amount of log data, most of which is not tagged as malicious. Related to malicious log entries generated by the logical black box described above, there is some repetition. Some things repeat a lot, some things repeat less, and there really is not any correlation between importance and repetition—which is a key aspect of the risk score—it is not merely a count of items, but takes into account importance, etc. That is, the specifics of how many "hits" were associated with a particular piece of malware does not seem to provide much insight—it is enough to know that, e.g., an infection has taken place or that someone was exposed to, albeit prevented from being victimized by some means of malware distribution. Since those are of real interest, we can safely dispense with the details and reduce the complexity of our analysis.

In an exemplary embodiment, a query can be performed in the logging node 140 or other data store with logs to perform a first level of aggregation. The query can use some form of a Structured Query Language (SQL) or the like. For example, the following example illustrates a first level query for extracting/counting threat names and/or hostnames aggregated by day, User ID, cloud name, and policy bucket (which is a way of aggregating threats such as malware, spyware, virus, etc.).

```
FROM
    web log
SELECT
    count(1)
GROUP BY
    interval(time, 86400),
    userid,
    distinct CASE
        when threatname = "NA" then hostname
        else threatname
    END THREATNAME,
    CASE
        when policy in (0) then 0
        when policy in (25,32,58) then 1
        when policy in (21, 23, 24, 37, 38, 51, 59, 60, 64, 65,
    78, 86, 88, 96, 134, 135, 136) then 2
        when policy in (11, 22, 27, 28, 29, 30, 31, 33, 34, 35,
    56, 57, 66, 67, 70, 74, 75, 77, 82, 83, 84, 85, 87, 89, 97,
    99, 128, 129, 131, 132, 137, 138, 139, 140, 141, 145, 148,
    149, 153, 154, 156, 157, 158) then 3
        ELSE 4
    END POLICY_SIMP,
    companyid,
    departmentid,
    locationid,
    cloudname
```

With the output of the first level, all the logs of a particular threat for a particular user on a particular day can be collapsed into one entry—"Threat 'A' Happened on Jan. 1, 2017," and continue in the same way for the rest of the threats present in the logging system.

From the first level aggregation, another query can be performed on the output keystore for a second level aggregation, which collapses the specific threats into categories and counts how many unique threats exist in a given policy bucket (examples of policy buckets are described below—also, the policy buckets are similar to the policy events described herein). For example, the following example illustrates a second level query.

```
FROM
    output
SELECT
    count(1) as count
WHERE
    userid != locationid
GROUP BY
    interval,
    userid,
```

```
                 companyid,
                 cloudname,
                 POLICY_SIMP
                 COPY TO
                 "score.zks"
```

The output, "score.zks" provides a mapping for each time period from user to the number of threats seen in each of the policy bucket categories. The following provides examples of the policy bucket category definitions:

1. Post-Infection Behavior

| | | |
|---|---|---|
| 25 | AT_REQ_BOTNETS_DENIED | Not allowed to browse this Botnet site |
| 32 | AT_REQ_BOTNET_CNC_DENIED | Detected possible botnet command and control traffic |
| 58 | AT_RES_BOTNET_CNC_DENIED | Detected possible botnet command and control traffic |

2. Pre-Infection Behavior

| | | |
|---|---|---|
| 21 | AV_AUTHENTIUM_VIRUS_SW_MW_BLOCK | Malicious file Blocked |
| 23 | AT_REQ_MALWARE_DENIED | Not allowed to browse this Malicious URL |
| 24 | AT_REQ_PHISHING_DENIED | Not allowed to browse this Phishing site |
| 37 | AT_RES_WRI_DENIED | This page is unsafe (high PageRisk index) |
| 59 | AT_RES_MALWARE_DENIED | Destination contains potentially malicious content (response) |
| 60 | AT_RES_PHISHING_DENIED | Destination contains potential phishing content |
| 64 | AT_REQ_ADSPYWARE_DENIED | Detected possible adware/spyware traffic (request) |
| 65 | AT_RES_ADSPYWARE_DENIED | Detected possible adware/spyware traffic (response) |
| 78 | AT_REQ_BROWSER_EXPLOIT_DENIED | Not allowed because this page contains known browser exploits (request) |
| 86 | MAPP_ADWARE_DENIED | communication with ad sites |
| 88 | MAPP_MALWARE_DENIED | malicious behavior |
| 96 | AT_BA_QUARANTINED | Quarantined |
| 51 | AT_FFVD_DENIED | Not allowed because this file contains known vulnerabilities |
| 135 | SMTP_AV_VIRUS_DROP | Virus found, message rejected |
| 134 | SMTP_AV_VIRUS_ATTACH_DROP | Virus found, attachment dropped |
| 136 | SMTP_AV_UWL | Virus UWL |
| 38 | AT_RES_BROWSER_EXPLOIT_DENIED | Not allowed because this page contains known browser exploits (response) |

3. Suspicious Behavior

| | | |
|---|---|---|
| 11 | BLACKLISTED | Not allowed because URL is blacklisted |
| 22 | DLP_DENIED | Violates Compliance Category |
| 27 | AT_RES_ACTIVEXBLOCK_DENIED | Not allowed because this page contains known dangerous ActiveX controls |
| 28 | AT_REQ_XSSATTPATT_DENIED | Block site vulnerable to XSS attacks |
| 29 | AT_REQ_COOKIESTEAL_DENIED | Possible browser cookie theft |
| 30 | AT_REQ_IRC_TUNNELING_DENIED | IRC use/tunneling not allowed (request) |
| 31 | AT_REQ_ANONYMIZER_DENIED | Use of anonymizing sites is not allowed (request) |
| 33 | WAC_DENIED | Secure Browsing blocked an outdated/disallowed component |
| 34 | WAC_WARNED | Secure Browsing warned about an outdated/disallowed component |
| 35 | AT_P2P_DENIED | Not allowed to browse this P2P site |
| 56 | AT_RES_IRC_TUNNELING_DENIED | IRC use/tunneling not allowed |
| 57 | AT_RES_ANONYMIZER_DENIED | Use of anonymizing sites is not allowed (response) |
| 66 | AT_REQ_WEBSPAM_DENIED | Not allowed to browse this web spam site |
| 67 | AT_RES_WEBSPAM_DENIED | Detected possible webspam traffic |
| 70 | CATEGORY_DENIED_OVERRIDE | Not allowed to browse this category, needs override |
| 74 | DLP_DENIED_ARCHIVED | Violates Compliance Category, archived to mailbox |
| 75 | DLP_DENIED_ARCHIVE_FAILED | Violates Compliance Category, archive to mailbox failed |
| 77 | MAPP_DENIED | Not allowed to use mobile App |
| 82 | MAPP_INSECURE_COMMUNICATION_DENIED | insecure user credentials |
| 83 | MAPP_GEO_LOCATION_DENIED | location information leak |
| 84 | MAPP_PII_DENIED | personally identifiable information (PII) |
| 85 | MAPP_DEVICE_INFORMATION_DENIED | information identifying the device |
| 87 | MAPP_3RD_PARTY_COMMUNICATION_DENIED | communication with unknown servers |
| 89 | MAPP_VULNERABLE_DENIED | known security vulnerabilities |
| 97 | AT_TUNNEL_DENIED | Not allowed to use tunnels |

| | | |
|---|---|---|
| 99 | FAKE_PROXY_AUTH_DENIED | Fake Proxy Authentication |
| 129 | SMTP_AV_ENCRYPTED_DROP | Password Encrypted attachment, message rejected |
| 132 | SMTP_AV_UNZIPPABLE_DROP | Unscannable attachment, message rejected |
| 137 | SMTP_SPAM_DROP | Spam detected, message rejected |
| 138 | SMTP_SPAM_UBL_DROP | Spam UBL detected, message rejected |
| 141 | SMTP_SPAM_SUSPECT_DROP | Spam suspected, message rejected |
| 145 | SMTP_MF_RCPT_DROP | Recipient rejected |
| 148 | SMTP_DLP_DROP | DLP hit, message rejected |
| 153 | SMTP_MF_ATTACHBLK_MSG_DROP | Attachment block hit, message rejected |
| 139 | SMTP_SPAM_SUSPECT_QTN | Spam suspected, message quarantined |
| 149 | SMTP_DLP_QTN | DLP hit, message quarantined |
| 128 | SMTP_AV_ENCRYPTED_ATTACH_DROP | Password Encrypted attachment, attachment dropped |
| 131 | SMTP_AV_UNZIPPABLE_ATTACH_DROP | Unscannable attachment, attachment dropped |
| 140 | SMTP_SPAM_SUSPECT_MARKSUBJ | Spam suspected, subject prepended |
| 154 | SMTP_SPAM_UWL | Spam UWL |
| 156 | SMTP_SPAM_SUSPECT_ALLOW | Spam suspected, message allowed |
| 157 | SMTP_SPAM_IPWL | Spam IPWL |
| 158 | SMTP_MF_ATTACHBLK_ATTACH_DROP | Attachment block hit, attachment dropped |

§ 9.2 Scoring

Ideally, it would be advantageous to compare users on the basis of how many threats they have in each category, how long threats have been present, and how important a threat is to consider. At the same time, it is also advantageous to keep the computation simple and with a minimal state.

The risk score could be computed as follows:

1. Collect a list of every threat type and block reason that a user has experienced in a day;
2. Place each threat into a policy bucket (POLICY_SIMP category); and
3. Count how many threat types a user has experienced within each of the categories and store that information.

In an exemplary embodiment, the risk score is made up of three components: pre-infection behavior (malware), post-infection behavior (infected), and suspicious behavior (suspicious), and the risk score can be expressed as [malware, infected, suspicious] vectors.

Since infected is very much more of a concern than malware and suspicious tends to overstate danger, some scaling factors are introduced such that some sample data resulted in more appropriate looking scores. For example, the factors can be 1, 10, and 0.5 for malware, infected, and suspicious, respectively. In this manner, malware has a factor of 1 and infected is an order of magnitude more important whereas suspicious is only half of malware. The weights are applied as follows in a risk score:

$$\sqrt{(1 \cdot malware)^2 + (10 \cdot infected)^2 + (0.1 \cdot suspicious)^2}$$

Here, the risk score is the hypotenuse, i.e., the square root of the sum of the squares of the weighted variables. In practice, it is efficient to express the problem in terms of matrices and use high-performance libraries suited to matrix multiplication for doing he actual computations.

It is also important to note that the components (malware, infected, and suspicious) and the scaling factors (1, 10, and 0.5) should be considered to be suggestions that currently make sense. In practice, the system should be implemented in such a way that more score components and scaling factors can be added without the need to make code changes. Of course, adjustments can be made over time as more is learned about the problem of risk.

§ 9.3 Length of Infection

It is also advantageous to take the length of infection into account with the risk score, or at least average length of infection, but to do so would require storing a list of every infection that a user had for every day. However, the amount of data stored per user can be fixed assuming that, e.g., if there are 3 infections on day one and three infections on day two, that they are the same infections. Having made that assumption, adding up the number of infections over, e.g., 5 days, then estimate the average period of infection as the sum of the bucket counts for the 5 days, all divided by 5. The estimate will be >=the actual average length of infection.

If the risk score is computed once per day, then just adding up the buckets will automatically include an overestimate of the average length of infection, which can be displayed separately in a User Interface (UI), if desired. Of course, the number will not be the exact average length of infection but is close.

§ 9.4 Future Considerations

The risk factors (e.g., malware, infected, and suspicious and the manner in which they are weighted undoubtedly will change over time, maybe even the general way in which they are combined. On the other hand, customers will want to be able to compare risk scores over time, and when the risk scoring algorithm or its parameters are updated, they should still be able to see what the score would be under previous parameters/mechanisms. For that reason, the risk scoring approach can include a version number on a scoring scheme and support multiple schemes at once in order to ease the transition and provide an ability for "apples-to-apples" comparisons.

In an exemplary embodiment, the risk scoring can be offered as a purchased feature/service to users of the distributed security system 100. In another exemplary embodiment, the risk scoring can be offered for all users (e.g., either a full version or limited version) with the intent of demonstrating additional services would be beneficial to manage risk. For example, a company may subscribe to a limited set of services through the distributed security system 100, but the risk scoring may show that some additional services may be advantageous to minimize risk.

§ 9.5 Company/Location Risk

At a company/location level, risk has something to do with the distribution of user-level scores, however, that is computed. In an exemplary embodiment, individual risk scores of users can be combined to provide an aggregate risk score for a company, location, etc. That is, the aggregate risk score defines the risk of a company, group, location, etc., i.e., some exemplary approaches for an aggregate risk score include:

1. The average of all users—however, this approach is problematic because of the overwhelming proportion of users with extremely low scores;
2. The average of all non-zero users;
3. The average of the top 100 risky users;
4. The score at which the number of users having a specified score gets very close to zero, i.e., a value from the X-axis where the users converge;
5. The score at the 99.9th percentile seems to have a strong relationship to approach #4; and
6. The company (or group, location, etc.) treated identically to a single user.

Approaches #3, #4, and #5 are normally distributed making these measurements convenient for comparing different companies, locations, groups, etc. These scores are all a measure of the riskiest users within a set of users. Since outliers are very large, averaging waters their effect down in a similar manner to how looking at the 99.9th percentile does.

§ 9.6 Representing the Status of an Organization/Location

Within an organization, scores of users are not normally distributed, but rather follow what looks like a Pareto/power law distribution, so the vast majority of users fall in the bottom risk level. It has been determined that score distribution serves as a good way to evaluate a company's risk level at a strategic level—replacing a few compromised desktop machines will not affect the overall distribution, but strategic moves like a company-wide phishing awareness could affect the distribution and thus the security health of the organization. This is an important aspect of the risk scoring described herein. Specific targeted measures like replacing compromised machines have little overall effect but updating or adding new policies does. That is, the objective of the risk score is to allow IT administrators a view on how proactive and reactive policies work towards actually reducing risk.

Figure 13:
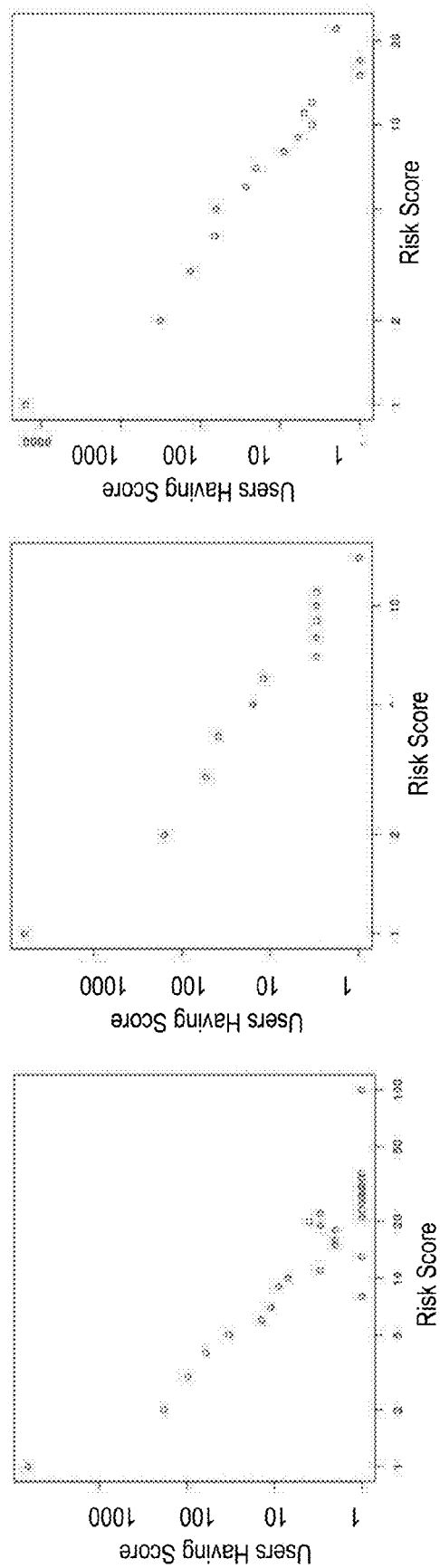
FIG. 13 is graphs of exemplary distributes of the risk score for a company, group, or location.

FIG. 13 illustrates graphs of exemplary distributes of the risk score for a company, group, or location. The risk scores can be presented in a GUI or the like, via the logging node 140, etc. A particular user could be displayed as a highlighted point in the distribution, noting the percentage of users that are riskier and less risky, similar to FIG. 13, describing how a company stands with respect to its peers.

§ 9.7 Relative Company Score

There are really only a couple differences between these organizations of various sizes, namely where the slope of the line naturally would be expected to reach zero and how far the outliers reach. If we compare companies on the basis of the lowest score where the probability reaches close to zero, then we get a measure of a company's health that is normally distributed.

Figure 14:
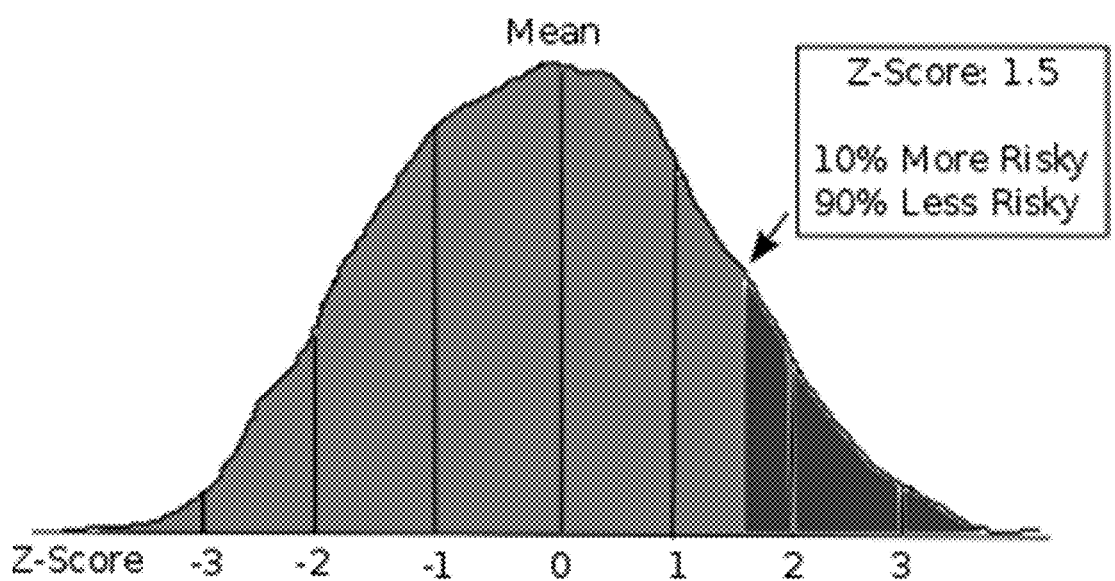
FIG. 14 is a graph of various company risk scores ("z-score").

FIG. 14 illustrates a graph of various company risk scores ("z-score"). Since the scores are normally distributed, companies can be compared in terms of their z-score: how many standard deviations they are from the mean if the user is interested in how they stand in terms of a vertical or in terms of customers of the distributed security system 100 in general. It can be shown where a company lies relative to others with a display similar to the following, where the company's score is in the context of what percentage of peers are more risky/less risky than their own.

§ 9.8 Raw Company Score

A company can also look at the score in raw terms, which reflects how they are doing overall. The raw number which relates to the highest non-outlying raw score of the company is affected by the threat landscape, how well the distributed security system 100 happens to be doing at detection (better detection means higher numbers) and how the company is performing. The raw score also measures something— namely, the number of threats faced for the most careless (within reason) of their users.

§ 10 Remedial Actions

The purpose of the risk score determination (for users, groups, locations, companies, etc.) and comparisons (to peers, to overall entities, etc.) is to guide IT administrators to minimize risk, i.e., lower the risk score. As described herein, the risk score can be continuously calculated over time and can be updated (with new parameters) such that apples-to-apples comparisons are possible. The objective is to take risk score measurements at different points in time to determine the efficacy of new policies and approaches to security. Again, the risk score is used in conjunction with the distributed security system 100 or some other security system.

The distributed security system 100 provides differing levels of security monitoring, e.g., SaaS subscriptions. For example, some services offered by the distributed security system 100 may include URL filtering, Phishing detection, File scanning/sandboxing, DLP, SSL interception, Whitelisting/blacklisting, Guest Wi-Fi protection, Advanced Persistent Threat (APT) protection, Firewall, etc. The objective of the risk score in one aspect is to determine if the proper mix or suite of services is being used. That is, periodic monitoring of the risk score over time can determine if a new service is having an effect or if it is necessary to switch to a different service. Also, the risk score can verify other security measures such as IT hardware infrastructure (VPN, etc.) effectiveness, social engineering awareness, etc.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method implemented through a distributed security system for determining and addressing risk of users, groups of users, locations, and/or companies, the method comprising:
   obtaining log data from the distributed security system, wherein the log data includes, for a plurality of users, threat types and block reasons by the distributed security system;
   aggregating the log data to determine threats based on the threat types and block reasons for an entity associated with the distributed security system, wherein the entity comprises one of a user, a group of users, a location, and a company;
   categorizing the threats for the entity to map behavior of the entity to pre-infection behavior, post-infection behavior, and suspicious behavior;
   analyzing the threats to obtain a risk score for the entity, wherein the risk score is a weighted combination of the pre-infection behavior, the post-infection behavior, and the suspicious behavior;
   performing one or more remedial actions for the entity; and
   subsequently obtaining updated log data and analyzing the updated log data to obtain an updated risk score to determine efficacy of the one or more remedial actions.

2. The method of claim 1, wherein the plurality of levels of aggregation are each a form of a Structured Query Language (SQL) query on the log data.

3. The method of claim 1, wherein the categorized threats are segmented in the pre-infection behavior, the post-infection behavior, and the suspicious behavior.

4. The method of claim 3, wherein the post-infection behavior is weighted higher than the pre-infection behavior which is weighted higher than the suspicious behavior.

5. The method of claim 1, wherein the entity comprises a company, group, or location and the risk score comprises a combination of risk scores associated with users of the company, group, or location.

6. The method of claim 5, further comprising:
   comparing the risk score to a plurality of risk scores for other entities; and
   performing the one or more remedial actions based on the comparing.

7. The method of claim 1, further comprising:
   performing one or more additional remedial actions based on the determined efficacy.

8. The method of claim 1, wherein the one or more remedial actions comprise adding or changing services for the entity from the distributed security system.

9. A distributed security system configured to determine and address risk of users, groups of users, locations, and/or companies, the distributed security system comprising:
   one or more cloud nodes configured to monitor for security threats and maintain logs of transactions; and
   one or more servers each comprising memory storing instructions that, when executed, cause a processor to
      obtain log data from the distributed security system, wherein the log data includes, for a plurality of users, threat types and block reasons by the distributed security system;
      aggregate the log data to determine threats based on the threat types and block reason for an entity associated with the distributed security system, wherein the entity comprises one of a user, a group of users, a location, and a company;
      categorize the threats for the entity to map behavior of the entity to pre-infection behavior, post-infection behavior, and suspicious behavior;
      analyze the threats to obtain a risk score for the entity, wherein the risk score is a weighted combination of the pre-infection behavior, the post-infection behavior, and the suspicious behavior;
      perform one or more remedial actions for the entity; and
      subsequently obtain updated log data and analyzing the updated log data to obtain an updated risk score to determine efficacy of the one or more remedial actions.

10. The distributed security system of claim 9, wherein the plurality of levels of aggregation are each a form of a Structured Query Language (SQL) query on the log data.

11. The distributed security system of claim 9, wherein the categorized threats are segmented in the pre-infection behavior, the post-infection behavior, and the suspicious behavior.

12. The distributed security system of claim 11, wherein the post-infection behavior is weighted higher than the pre-infection behavior which is weighted higher than the suspicious behavior.

13. The distributed security system of claim 9, wherein the entity comprises a company, group, or location and the risk score comprises a combination of risk scores associated with users of the company, group, or location.

14. The distributed security system of claim 13, wherein the instructions that, when executed, further cause a processor to
   compare the risk score to a plurality of risk scores for other entities; and
   perform the one or more remedial actions based on the comparing.

15. The distributed security system of claim 9, wherein the instructions that, when executed, further cause a processor to
   perform one or more additional remedial actions based on the determined efficacy.

16. The distributed security system of claim 9, wherein the one or more remedial actions comprise adding or changing services for the entity from the distributed security system.

17. A log node in a distributed system configured to determine and address risk of users, groups of users, locations, and/or companies, the log node comprising:
- a network interface, a data store, and a processor communicatively coupled to one another; and
- memory storing computer executable instructions, and in response to execution by the processor, the computer-executable instructions cause the processor to
  - obtain log data from the distributed security system, wherein the log data includes, for a plurality of users, threat types and block reasons by the distributed security system;
  - aggregate the log data to determine threats based on the threat types and block reason for an entity associated with the distributed security system, wherein the entity comprises one of a user, a group of users, a location, and a company;
  - categorize the threats for the entity to map behavior of the entity to pre-infection behavior, post-infection behavior, and suspicious behavior;
  - analyze the threats to obtain a risk score for the entity, wherein the risk score is a weighted combination of the pre-infection behavior, the post-infection behavior, and the suspicious behavior;
  - cause or suggest performance one or more remedial actions for the entity; and
  - subsequently obtain updated log data and analyzing the updated log data to obtain an updated risk score to determine efficacy of the one or more remedial actions.

* * * * *